(12) United States Patent
Jørgensen

(10) Patent No.: US 9,732,942 B2
(45) Date of Patent: Aug. 15, 2017

(54) COLOR MIXING ILLUMINATION DEVICE

(75) Inventor: Dennis Jørgensen, Rønde (DK)

(73) Assignee: MARTIN PROFESSIONAL APS, Aarhus N (DK)

( * ) Notice: Subject to any disclaimer, the term of this patent is extended or adjusted under 35 U.S.C. 154(b) by 0 days.

(21) Appl. No.: 14/125,251

(22) PCT Filed: Jun. 8, 2012

(86) PCT No.: PCT/DK2012/050197
§ 371 (c)(1),
(2), (4) Date: Jan. 15, 2014

(87) PCT Pub. No.: WO2012/167799
PCT Pub. Date: Dec. 13, 2012

(65) Prior Publication Data
US 2014/0185285 A1    Jul. 3, 2014

(30) Foreign Application Priority Data

Jun. 10, 2011   (DK) .................................. 2011 70292

(51) Int. Cl.
*F21V 14/00* (2006.01)
*F21V 14/02* (2006.01)
(Continued)

(52) U.S. Cl.
CPC .............. *F21V 14/00* (2013.01); *F21V 14/02* (2013.01); *F21V 14/06* (2013.01); *F21V 5/007* (2013.01);
(Continued)

(58) Field of Classification Search
CPC .................................. F21V 14/02; F21V 14/06
(Continued)

(56) References Cited

U.S. PATENT DOCUMENTS 5,309,277 A   5/1994 Deck
6,227,669 B1  5/2001 Tiao et al.
(Continued)

FOREIGN PATENT DOCUMENTS

EP    1710493 A    10/2006
JP    2004004359 A  1/2004
(Continued)

OTHER PUBLICATIONS

International Search Report, PCT/DK2012/050197, Jun. 8, 2012.

*Primary Examiner* — Anh Mai
*Assistant Examiner* — Zachary J Snyder
(74) *Attorney, Agent, or Firm* — Artegis Law Group, LLP

(57) ABSTRACT

The present invention relates to an illumination device comprising a number of light sources generating light and a number of light collecting means adapted to collect the generated light and to convert the collected light into a number of light beams that propagate along an optical axis. The light sources are arranged in a first group and second group of light sources which are individually controllable. The light collecting means and light sources are displaceable in relation to each other between a first position where the light collecting means collect light from the first group of light sources and convert the collected light into a number of first light beams, and a second position where the light collecting means collect light from the second group of light sources and convert the collected light from the second group of light sources into number of second light beams.

19 Claims, 15 Drawing Sheets

(51) Int. Cl.
*F21V 14/06* (2006.01)
*F21W 131/406* (2006.01)
*F21W 131/407* (2006.01)
*F21V 17/02* (2006.01)
*F21V 5/00* (2015.01)
*F21V 5/04* (2006.01)
*F21Y 101/00* (2016.01)
*F21Y 115/10* (2016.01)
*F21Y 113/13* (2016.01)
*F21Y 107/60* (2016.01)

(52) U.S. Cl.
CPC .............. *F21V 5/008* (2013.01); *F21V 5/04* (2013.01); *F21V 17/02* (2013.01); *F21W 2131/406* (2013.01); *F21W 2131/407* (2013.01); *F21Y 2101/00* (2013.01); *F21Y 2107/60* (2016.08); *F21Y 2113/13* (2016.08); *F21Y 2115/10* (2016.08)

(58) Field of Classification Search
USPC ........................................................ 362/232
See application file for complete search history.

(56) References Cited

U.S. PATENT DOCUMENTS

| | | |
|---|---|---|
| 6,402,347 B1 | 6/2002 | Maas et al. |
| 6,443,594 B1 | 9/2002 | Marshall et al. |
| 7,226,185 B2 | 6/2007 | Dolgin et al. |
| 2003/0218723 A1 | 11/2003 | Yamanaka |
| 2004/0125344 A1 | 7/2004 | Matsui |
| 2007/0024971 A1 | 2/2007 | Cassarly et al. |
| 2007/0109501 A1 | 5/2007 | Imade |
| 2008/0273324 A1 | 11/2008 | Becker et al. |
| 2009/0268458 A1 | 10/2009 | Feinbloom et al. |
| 2010/0188018 A1* | 7/2010 | Salm .................. F21V 7/00 315/294 |

FOREIGN PATENT DOCUMENTS

| | | |
|---|---|---|
| JP | 2006269182 A | 10/2006 |
| WO | 0198706 A | 12/2001 |
| WO | 06023180 A | 2/2006 |
| WO | 2010103477 A1 | 9/2010 |
| WO | 2010113100 A | 10/2010 |
| WO | 2010113101 A | 10/2010 |
| WO | 2011076213 A | 6/2011 |
| WO | 2012167798 A | 12/2012 |
| WO | 2014040598 A | 3/2014 |

* cited by examiner

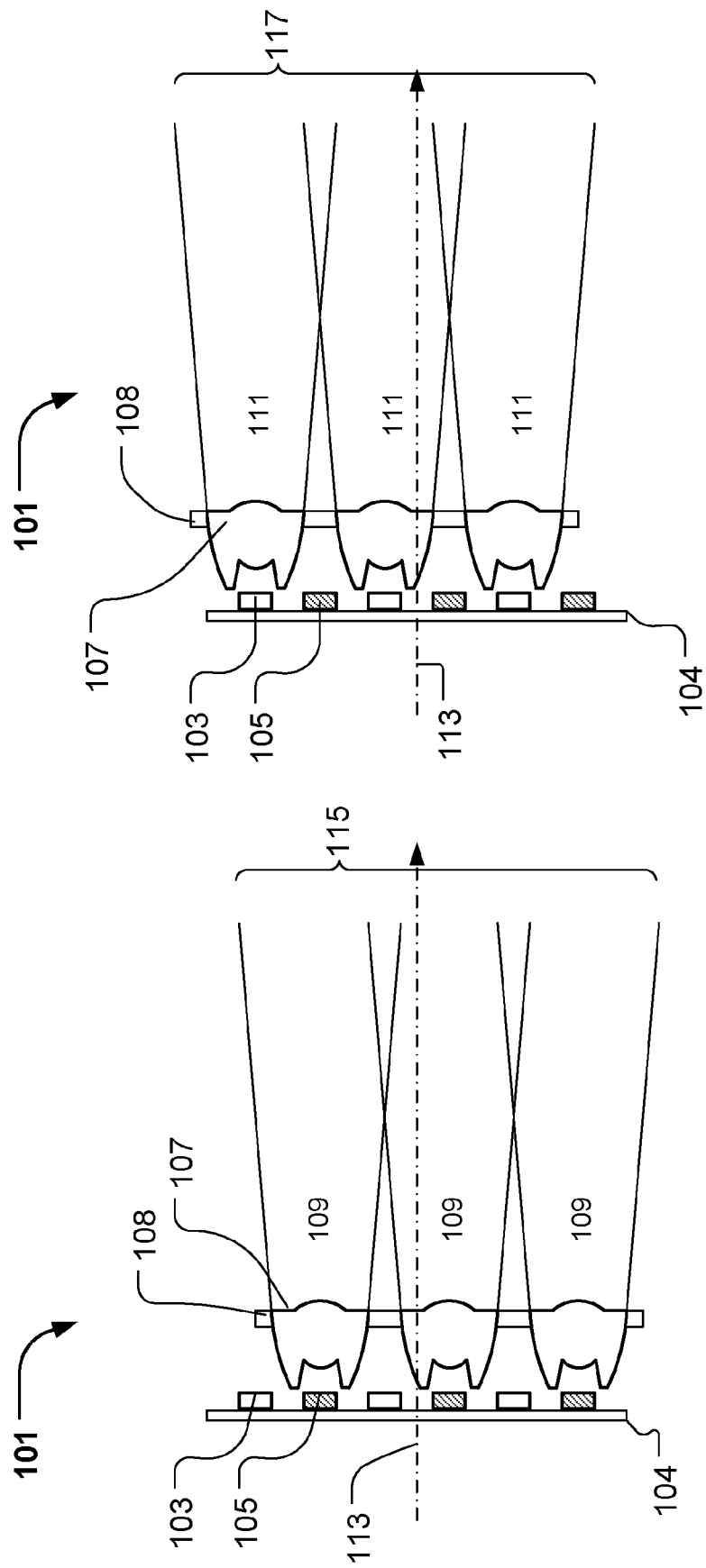

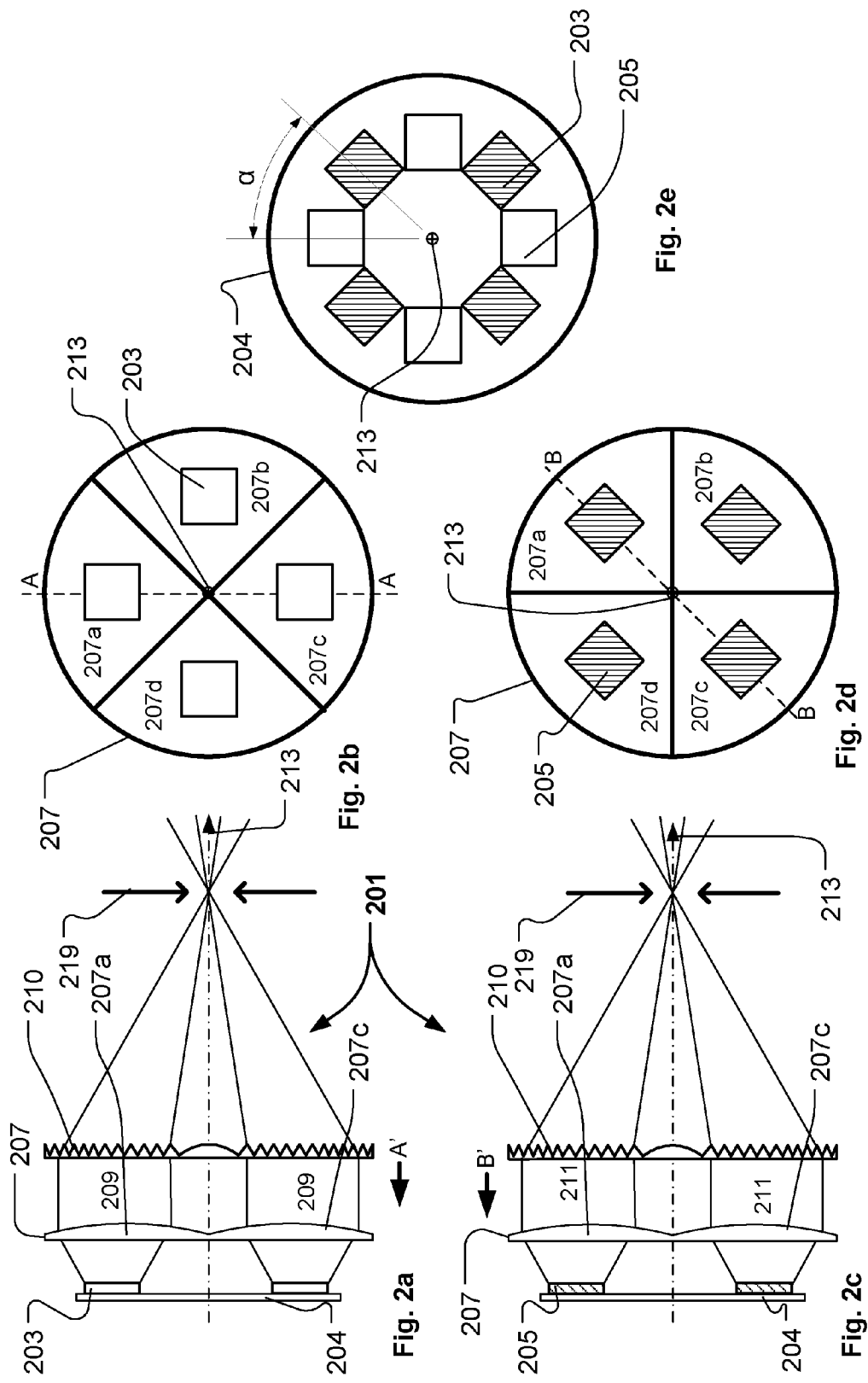

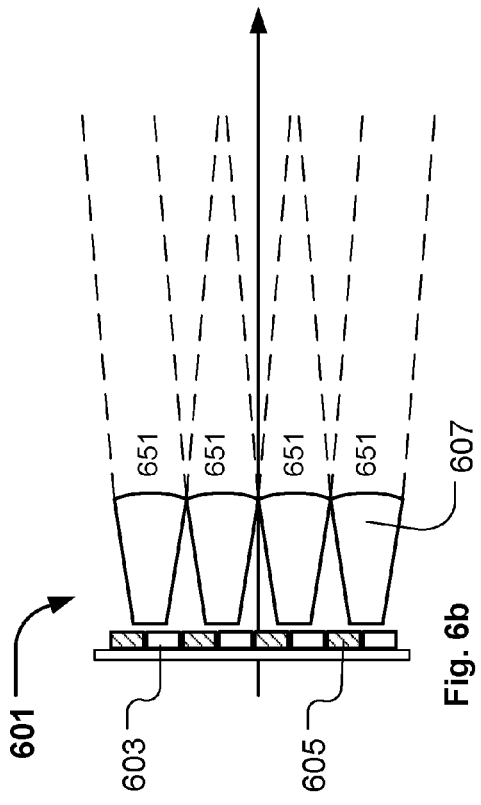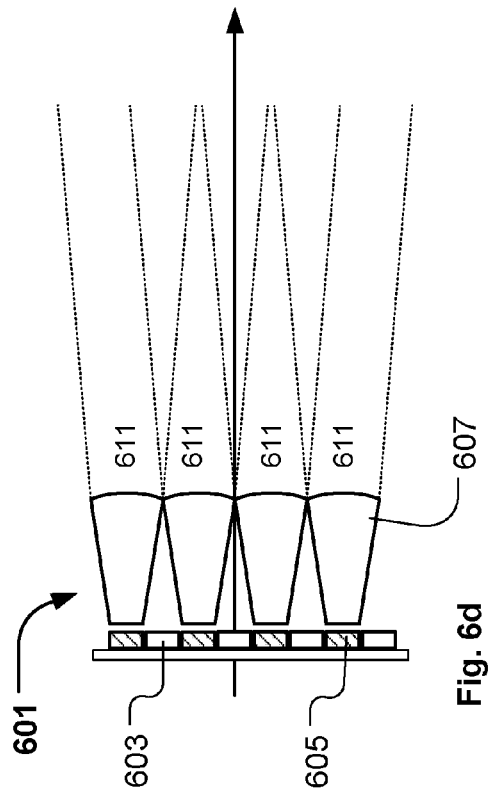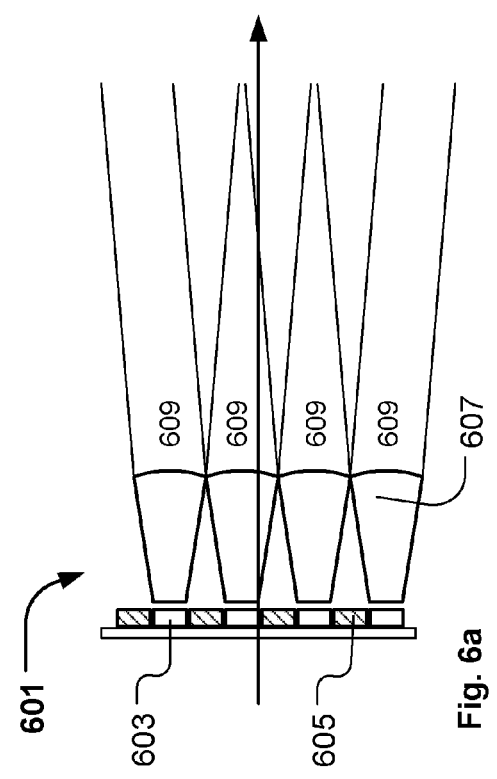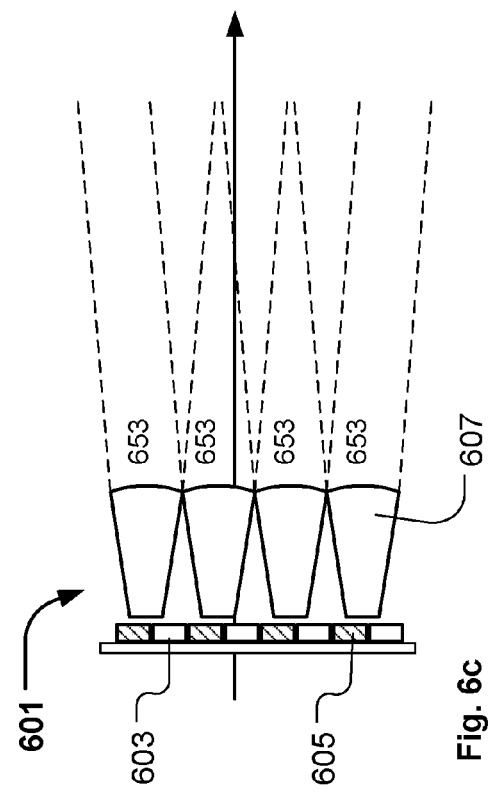
Fig. 6a
Fig. 6b
Fig. 6c
Fig. 6d

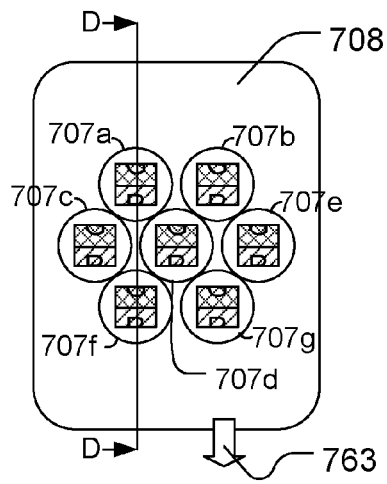
Fig. 7g
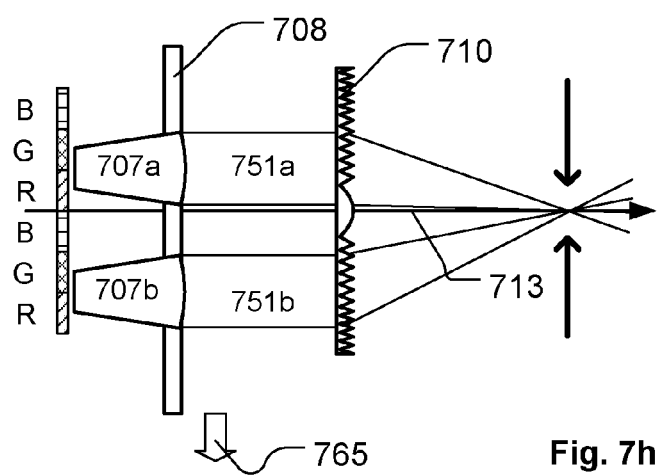
Fig. 7h
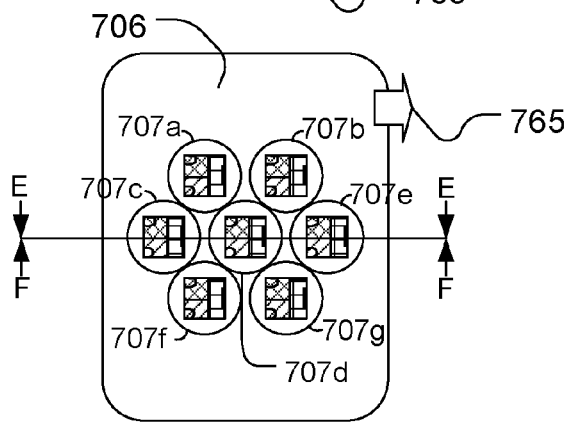
Fig. 7i
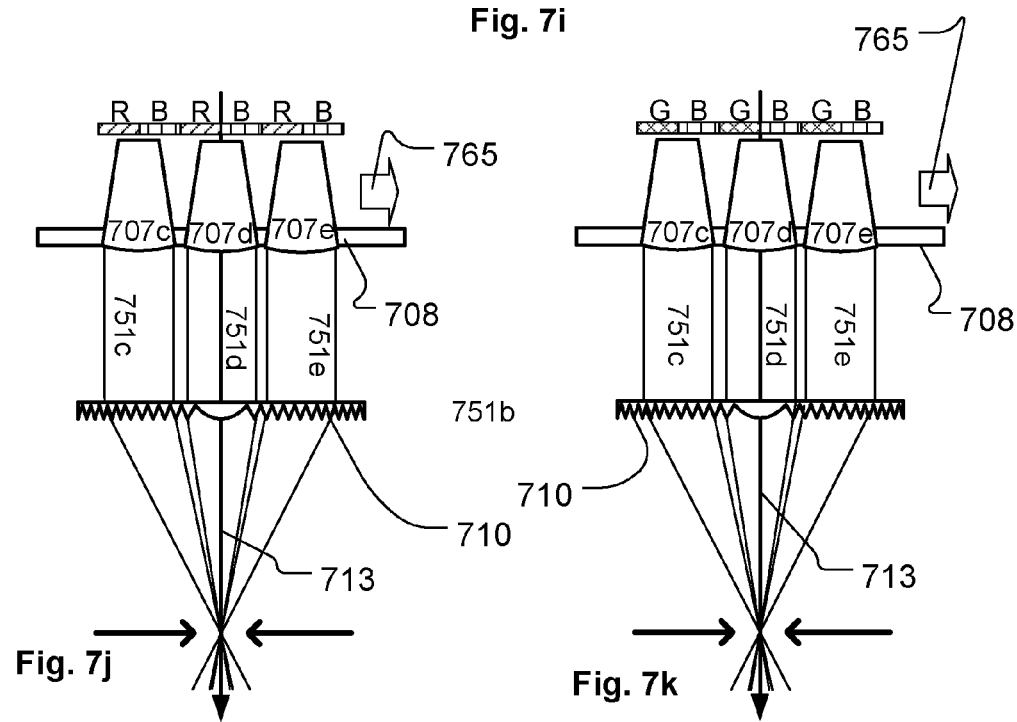
Fig. 7j
Fig. 7k

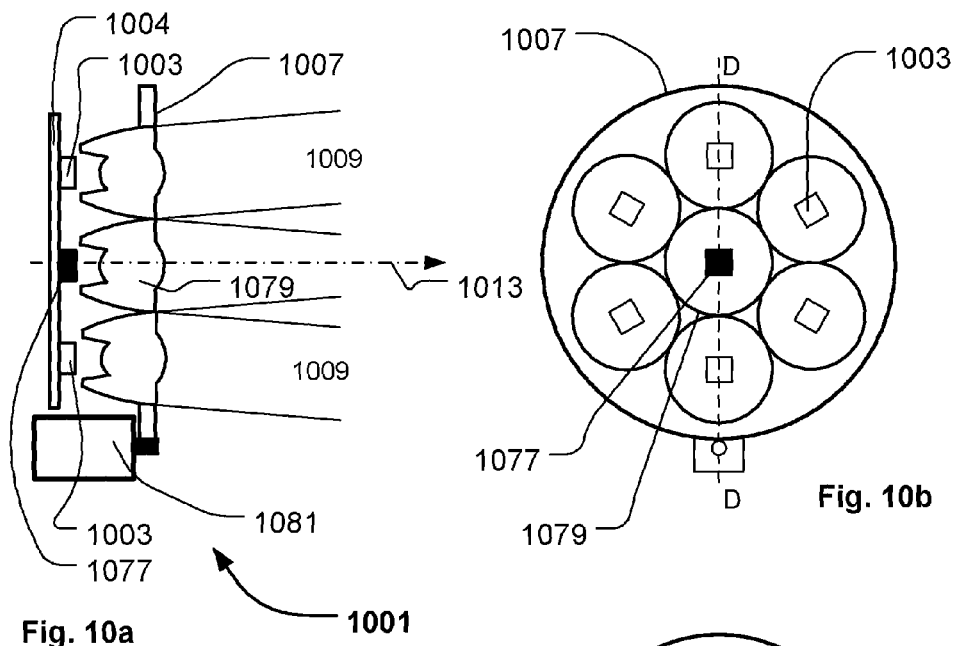
Fig. 10a
Fig. 10b
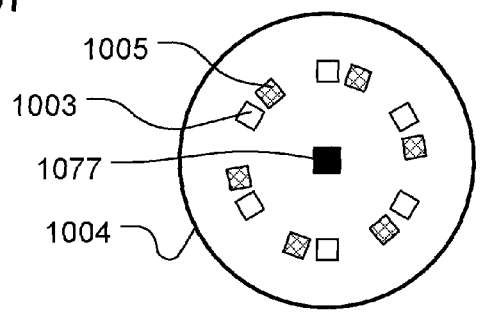
Fig. 10e
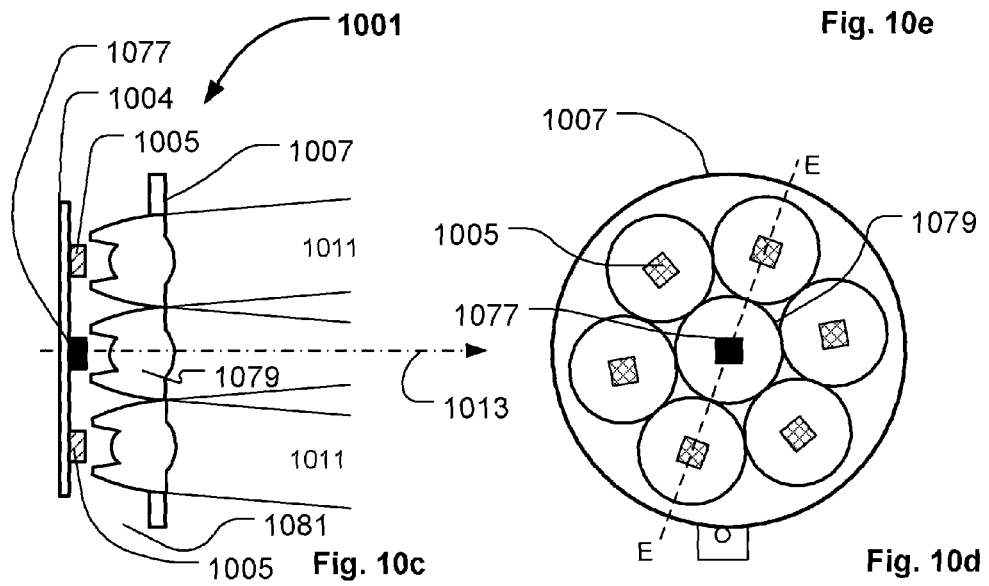
Fig. 10c
Fig. 10d

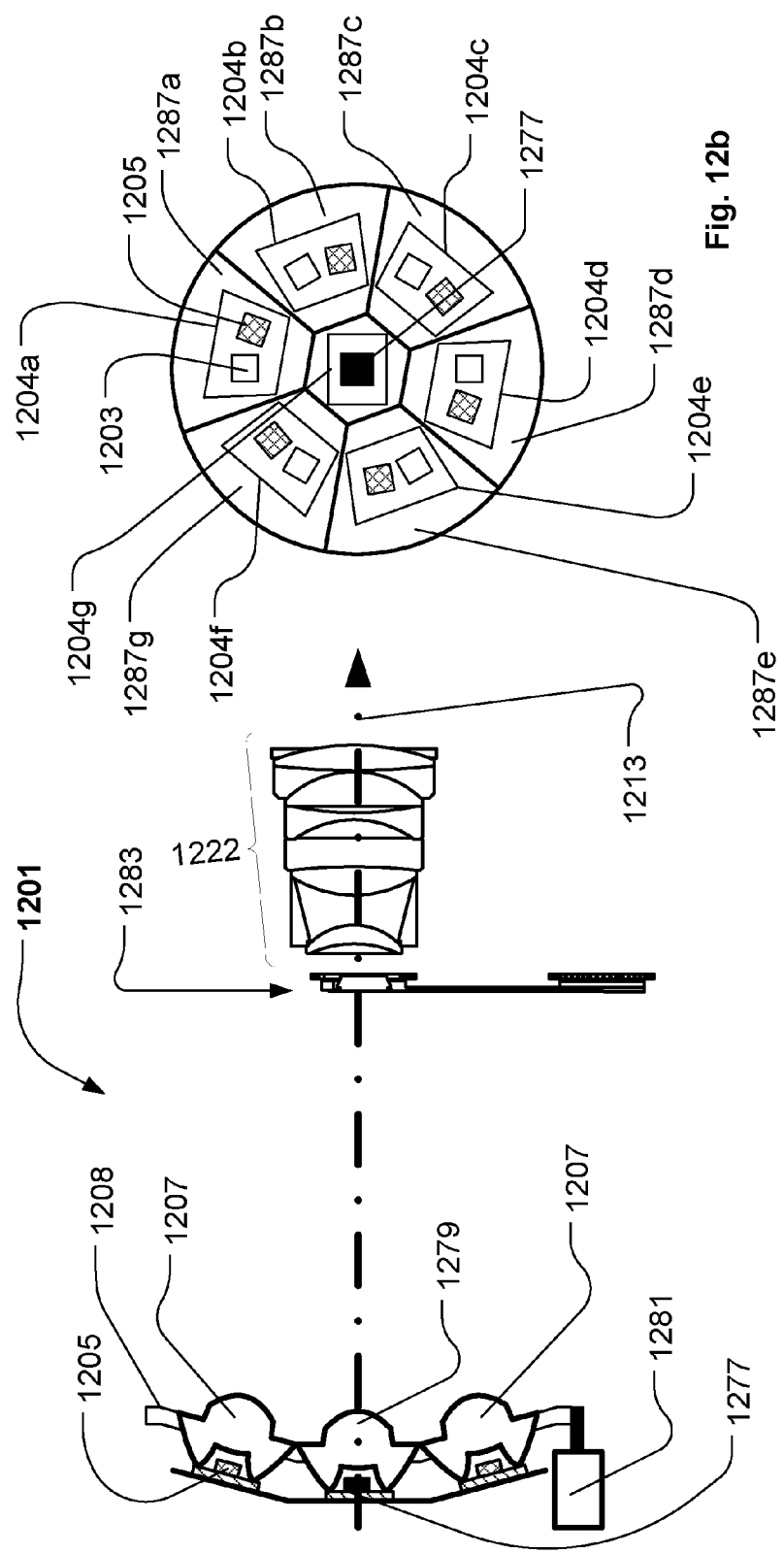

COLOR MIXING ILLUMINATION DEVICE

FIELD OF THE INVENTION

The present invention relates to an illumination device comprising a number of light sources generating light and a number of light collecting means adapted to collect the generated light and to convert the collected light into a number of light beams that propagate along an optical axis.

BACKGROUND OF THE INVENTION

In order to create various light effects and mood lighting in connection with concerts, live shows, TV shows, sport events or as a part on architectural installation light fixtures creating various effects are getting more and more used in the entertainment industry. Typically entertainment light fixtures creates a light beam having a beam width and a divergence and can for instance be wash/flood fixtures creating a relatively wide light beam with a uniform light distribution or it can be profile fixtures adapted to project image onto a target surface.

Light emitting diodes (LED) are, due to their relatively high efficiency, low energy consumption, long lifetime, and/or capability of electronic dimming, becoming more and more used in connection with lighting applications. LEDs are used in lighting applications for general illumination such as wash/flood lights illuminating a wide area or for generating wide light beams e.g. for the entertainment industry and/or architectural installations. For instance like in products like MAC101™, MAC301™, MAC401™, Stagebar2™, Easypix™, Extube™, Tripix™, Exterior 400™ series provided by the applicant, Martin Professional a/s. Further LEDs are also being integrated into projecting systems where an image is created and projected towards a target surface. For instance like in the product MAC 350 Entrour™ provided by the applicant, Martin Professional a/s.

Different kinds of LEDs are currently commercially available. For instance LEDs may be provided as colored LEDs emitting light having a relatively narrow spectral bandwidth and thus emitting light of a single color. Typically LED based lighting products include a number of these LEDs of different colors and light generated by the LEDs provided are combined into an outgoing light beam. The intensity of each color can be adjusted relatively to each other whereby the color of the outgoing light beam can be varied as known in the art of additive color mixing. These lighting products can thus create any color within the color gamut defined by the color of the LEDs. Typically this kind of lighting products include red LEDs, green LEDs and blue LED and are known as RGB lighting products. The RGB lighting products can produce red, green and blue by turning the LED of only one color on while turning the remaining colors off. Further the RGB products can produce white light by turning all colors on (and approximately at the same intensity) at the same time. However the color rendering index (CRI) of the white light is very low due the fact that the white is created by combining light with a narrow spectral bandwidth. The consequence is that an object illuminated by this white light, is not reproduced in its natural colors (as it appears when illuminated by sun light).

LEDs are also provided as white LEDs adapted to emit light having a board spectral bandwidth and these may further be provided with different color temperature. These LEDs have a high CRI, as they emitted light over a large spectral bandwidth and are thus used in LED based lighting products to create bright white light, which can be used to illuminate objects and reproduce the objects in substantially its natural color. However LED based lighting product based on white LEDs cannot create colored light beams without using a color filter as known in the art of subtractive color filtering.

RGBW LED based lighting products, where a number of single color LEDs and a number of white LEDs are combined, are also provided in order to be able to create different colors using additive color mixing and to improve the CRI and the efficacy of the white light. This is achieved by replacing a number of the colored LED with a number of the white LEDs. The white LEDs provide light having a broad spectral bandwidth and the CRI of the white light produced by such device is thus improved by white LEDs and the intensity of the white light is also increased. However the down side it that the intensity of the situated colors are reduced since there are fewer of these.

The LEDs are also provided in packages having a multiple amount a LED dies emitting light of different color and additionally also a led die emitting white light. The LED dies can be controlled individual, whereby the relative intensity of the light emitted by each dies may be varied in relation to each other whereby the color of the outgoing light can be varied as known in the art of additive color mixing. Typically these LED packages includes a red die, green die, blue die and a white die and are known as RGBW 4in1 LEDs. The RGBW 4in1 LED are often used in RGBW LED based lighting products as described above.

In general it is desired to have a multi-colored LED lighting product with a high lumen and also a high CRI. However this is hard to achieve with the LED types describe above as it due to Etendue limitations is not possible to combine light from an unlimited amount of light sources into a light beam. The known LED based lighting products are as a consequence often designed for specific purposes and it is often necessary to have a large range of LED based lighting products in order to be able to provide a large variety of lighting solutions. This is especially the case in connection with projecting systems, where the light is coupled through an optical gate, where an image creating objects (GOBO) is positioned. An optical projecting system collects the light from the optical gate and is adapted to image the optical gate (and thus also the image creating object) at a target surface. The light beam is very narrow when it passes the optical gate and such projecting systems are thus limited by Etendue. The Etendue, $E=A*\Omega$, at the gate through which light is emitted has a limited opening area A and the imaging optics only collect light from a limited solid angle $\Omega$. For light sources the Etendue can be calculated in the same way, where A is the radiating area, and $\Omega$ is the solid angle it radiates into. Further it is also desired to have very compact illumination devices, which is difficult to achieve when more light sources are being integrated into the same illumination device.

In projecting systems the light is generally collected into an optical gate where the image is generated, and an imaging optical system projects the gate onto a target surface. WO0198706, U.S. Pat. No. 6,227,669 and U.S. Pat. No. 6,402,347 disclose lighting systems comprising a number of LEDs arranged in a plane array where a converging lens is positioned in front of the LED in order to focus the light, for instance to illuminate a predetermined area/gate or for coupling the light from the diodes into an optical fiber.

U.S. Pat. No. 5,309,277, U.S. Pat. No. 6,227,669, WO0198706, JP2006269182 A2, EP1710493 A2, U.S. Pat. No. 6,443,594 disclose lighting systems where the light from a number of LEDs is directed towards a common focal point or focusing area, for instance by tilting the LEDs in relation to the optical axis (JP2006269182 A2, WO0198706, U.S. Pat. No. 5,309,277) or by using individually refracting means positioned in front of each LED (U.S. Pat. No. 6,443,594, U.S. Pat. No. 7,226,185B, EP1710493).

WO06023180 discloses a projecting system comprising a LED array with a multiple number of LEDs where the light from the LEDs is directed towards a target area. The LEDs may be mounted to a surface of a curved base.

Systems where a multiple number of light sources are arranged on a successive moving emission illumination unit, and where the light from the multiple number of light sources are successively coupled into an optical system are also known. The successive moving emission unit moves successive in relation to the optical system whereby different light sources are alternately placed in the optical system, such that light can be coupled into the optical system. Controlling means are adapted to turn the light sources on when they are placed in the optical system and turn the light sources off when they leave the optical system. One advantage of this kind of systems is the fact that the light sources can be overloaded (with current) as they only need to be turned on for a very short period of time (when they are positioned in the optical path). Further the light sources can be cooled when they are not turned on and positioned outside the optical system. For instance US2003/0218723, WO03/063477, JP2004004359 and US2004/0125344 disclose such systems. This kind of systems are rather complex in size and difficult to manufacture as the successive moving emission illumination unit must move continuously and fast in relation to the optical system which can be a challenge as power and control signals must be feed to the light sources. Further the size of such system become relatively large as the large number of light sources takes up much space and only a very few light sources are used for the illumination purpose. US2007/0109501 discloses an illumination apparatus illuminating an objective illumination region. The illumination apparatus comprises a plurality of illuminants having light-emitting surfaces radiating diffused light, an illuminant substrate in which the illuminants are disposed so as to be set in array on the circumference, at least one optical member configured to guide the diffused light to the objective illumination region. A movable section is configured to drive the optical member so as to be rotatable around the center of the circumference serving as a rotation center, and a lighting control section configured to control a light-emitting timing of the plurality of illuminants. The movable section and the lighting control section operate together such that the quantity of light per unit time of the diffused light guided to the objective illumination region is within a predetermined range. The illuminants are embodies as red, green and blue LED and the optical member rotates continuously in relation the LEDs and collects light from the LED alternately. As a consequence the optical member collects only light form a limited amount of light sources which can be used in the later optical system. Further the light sources are alternately switched/turned on an off and can thus be overloaded (with current) during operation. The illumination apparatus discloses by U2007/0109501 provides an alternative solution to the rotating color wheels known form video projectors. Further the optical members are embodied as an L-shaped light rod where the collected light are reflected forwardly by using total internal reflection. However even, that in theory not loss occurs in total internal reflection the reflection surface introduces a great loss of light since not all light will hit/imping the reflective surface of the optical member within the critical angle required for total internal reflection. Further the illumination apparatus disclosed by US2007/0109501 are rather big as the illumines are arranged circumference at a distance from the optical axis. Another fact is that the CRI of the light created by this illumination apparatus is very bad due to the fact the only red, green and blue led are used. US2009/059557 relates to a similar system.

The prior art fixtures try to increase the lumen output by adding as many light sources as possible. The consequence is, however, that the efficiency with regard to power consumption versus light output is very low, as it is fundamentally only possible to effectively utilize light sources of same or less Etendue as the imaging optics in this kind of optical system. So if the source Etendue is a close match to the Etendue of the imaging system there are no gains in using multiple sources in order to increase the light output (intensity/lumen) as the Etendue of the light sources then will be larger than the Etendue of the imaging system and the imaging system is thus not capable of collecting the light.

Furthermore, a large amount of light is lost as the prior art fixtures typically only couple a central part of the light of the light beams through the gate in order to provide a uniform illumination of the gate, which again reduces the efficiency. The space in light fixtures is often limited and it is difficult to fit many light sources into prior art fixtures, for instance because the optical components associated with the light sources often take up a lot of space. Yet another aspect is the fact that color artifacts often appear in the output from fixtures having light sources of different colors. The reason for this is the fact that high performance LEDs used for stage-illumination have large, rectangular die areas of 1-12 mm2 and even higher This implies, that it is not possible to model the primary optics to a point source since the size-ratio between the primary optics and the LED die can get rather small. Furthermore, the rectangular shape can also be imaged in the output as rectangular patches. Compared to discharge lamps, these patches are ill fitted to smoothly fill out the circular spot profiles of stage-illumination instruments.

DESCRIPTION OF THE INVENTION

The object of the present invention is to solve the above described limitations related to prior art. This is achieved by an illumination device and method as described in the independent claims. The dependent claims describe possible embodiments of the present invention. The advantages and benefits of the present invention are described in the detailed description of the invention.

DESCRIPTION OF THE DRAWING

FIG. 1*a-b* illustrate a simple embodiment of an illumination device according to the present invention;

FIG. 2*a*-2*e* illustrate another embodiment of an illumination device according to the present invention;

FIG. 6*a*-6*d* illustrate another embodiment illumination device according to the present invention;

FIG. 10a-10e illustrate another embodiment of an illumination device according to the present invention;

FIGS. 12a and 12b illustrate a block diagram of another illumination device according the present invention.

DETAILED DESCRIPTION OF THE INVENTION

Figure 3A:
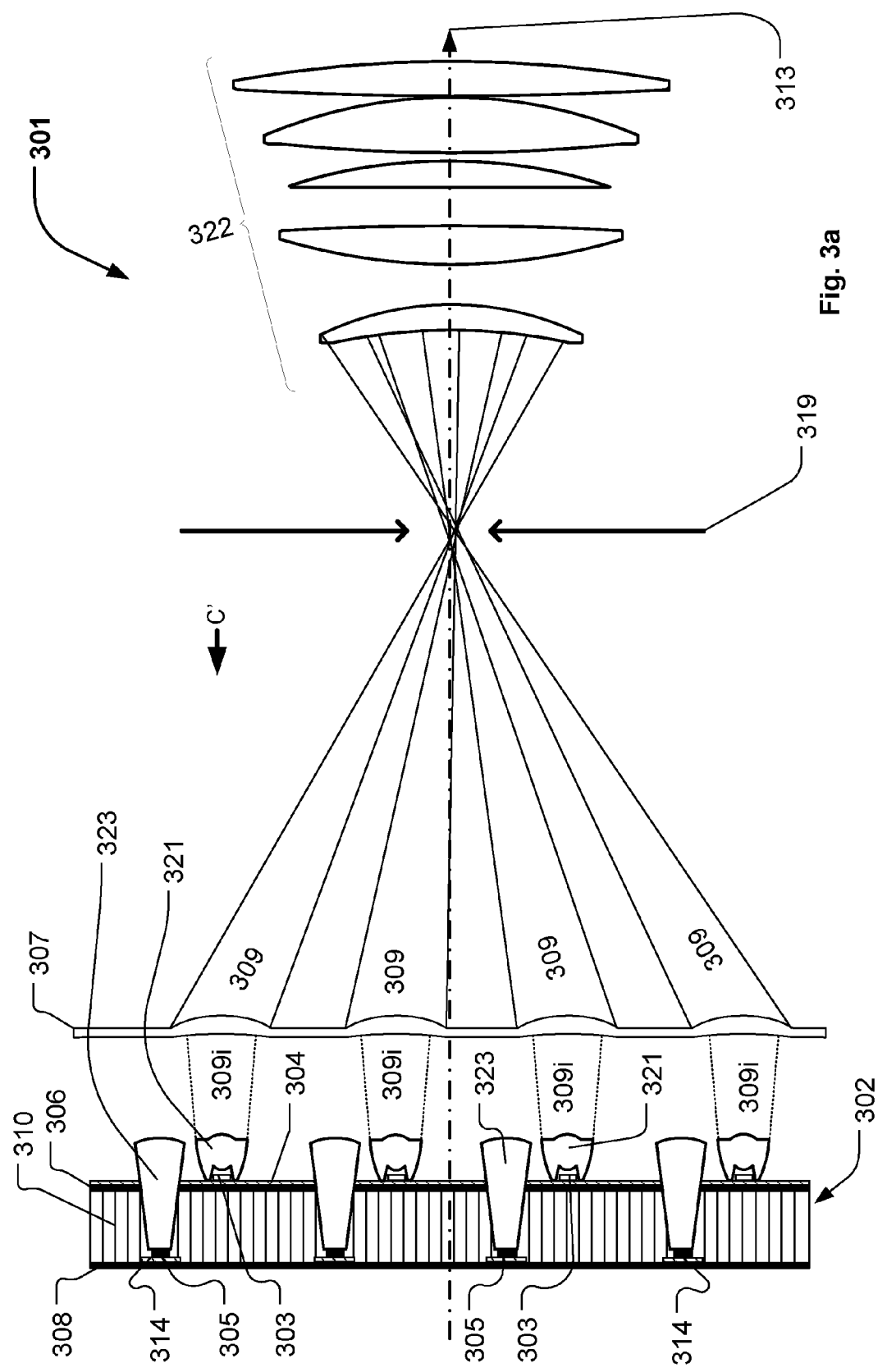
FIG. 3*a*-3*e* illustrate another embodiment of an illumination device according to the present invention.

The present invention is described in view of an illumination device comprising a number of LEDs that generate a light beam, however the person skilled in the art realizes that any kind of light source such as discharge lamps, OLEDs, plasma sources, halogen sources, fluorescent light sources, etc can be used. Further it is to be understood that the illustrated embodiments only serve as illustrating examples illustrating the principles of the present invention and that the skilled person will be able to provide several embodiments within the scope of the claims. In the illustrated embodiments the illustrated light beams and optical means do only serve as to illustrate the principles of the invention rather than illustrating exact and precise light beams and optical means.

FIGS. 1a and 1b illustrate a simplified cross-sectional view of an embodiment of an illumination deceive 101 according to the present invention and illustrate the light collecting means and light sources in respectively a first position and a second position.

The illumination device 101 comprises a number of light sources generating light, the light sources are arranged in a first group of light sources 103 (illustrated as white quadrangles) and in a second group of light sources 105 (illustrated as hatched quadrangles). The light sources are mounted on a PCB 104 (printed circuit board) and the two groups of light sources can be controlled individually for instance by a controller (not shown) as known in the art of lighting. The controller is thus adapted to treat the two groups of light sources as at least two individual groups of light sources which can be individually controlled. The skilled person realizes that each group of light sources can be divided into a number of sub-groups which also can be controlled individual and that it also may be possible to control each single light source individually. A number of light collecting means 107 are arrange above the light sources 103 and 105. The light collecting means 107 and light sources 103/105 are movable in relation to each other between a first position (illustrated in FIG. 1a) and a second position (illustrated in FIG. 1b) and can be fixed in both the first position and in the second position. In the first position the light collecting means 107 are adapted to collect light from the first group of light sources 103 and convert the collected light from the first group of light sources into a number of first light beams 109. Similar in the second position the light collecting means 107 are adapted to collect light from the second group of light sources 105 and convert the collected light from the second group of light sources into a number of second light beams 111.

This makes it possible to provide a multi-color illumination device with a high lumen output and high CRI. This is achieved as illumination device can be used in two modes of operations where the first group of light sources is used in the first mode of operation and where the second group of light sources is used in the second mode of operation. The shift between the two modes of operation can be performed by moving the collecting means 107 and the light sources 103/105 in relation each other between the first and second position and thereafter fixing the light sources and light collecting means in the first position or the second position. The illumination device makes it possible to integrate a large number of light sources into one common illumination device without exceeding the Etendue limit, as only a sub-part of the light sources are used at the same time. Typically the physical dimensions of the light collecting means 107 are larger than the physical dimension of the light source. This makes it possible provide a large number of light sources in an array and adapt the light collecting means only to collect light for some of the light sources. The light collecting means can be adapted to collect light form another part of the light sources by moving the light sources and the light collecting means in relation to each other and thereby choose which light sources are being used. Allowing the light collecting means and light sources to be fixed in relation to each other in the first position and/or the second position makes it possible to run the illumination device in the two mode of operations as along as desired. Further the fixing of the light collecting means and light sources in relation to each other makes sure that the light collecting means and light source remains properly aligned while the illumination device is different mode of operations.

In a possible embodiment the first group of light sources can comprises a number of single color LED's of different colors which makes it possible to provide a multi-color illumination device with very bright situated colors. The second group of light sources can then comprise a number of white LEDs which makes it possible to provide an illumination device having high lumen and high CRI. In this embodiment the illumination device can be switch between a multicolored illumination device (for instance a RGB device) with very bright saturated colors and a white illuminating device with a high CRI. The switching can be performed fast, as the light collecting means and the light sources only need to be moved a small distance in relation each other.

In another possible embodiment the first group of light sources can be embodied as a number of RGBW LEDs which acts at a multi-colored device where the additionally white LEDs improve the CRI. The second group of light sources can then comprise a number of white LEDs which makes it possible to operate the illumination device as a very bright white illumination device. In fact the skilled person realizes that it is possible to provide compose the light sources of the first and second group of light sources as desired. Further it is also possible provide additional groups of light sources and make the light collecting means and light sources movable into additional position where they can be fixed in relation to each or the, such that the light collecting means collect light from the additional groups of light sources when fixed in the additional positions.

It is also possible to provide the first and second group of light sources with the same kind of light sources such that the illuminations created by the first and second groups of light sources are identical. The consequence is that the illumination comprises two set of identical light sources and the illumination device can be adapted to switch from the first group of light sources to the second group of light sources if the first group of light sources experience malfunction for instance due to the fact that the light sources of the first group have been worn-out. This can for instances be useful in connection with architectural lighting devices which is arranged at nearly inaccessible places as maintenance intervals of the light sources can be increased. In fact the maintenance interval replacing worn-out light sources can be doubled in light sources comprising two identical groups of light sources. The skilled person will understand that the maintenance interval can be increased further if additional group of light sources are added.

In the illustrated embodiment the light beams 109 and 111 propagate along an optical axis 113; meaning largest basis vector of a vector (typical 3D) defining the direction of propagation of the light beam is parallel with the optical axis 113. A long the optical axis the light beams 109 and 111 merge respectively into a first common light beam 115 and a second common light beam 117. The first and second common light beams 109,111 have a beam divergence determined by the characteristics of the light sources and the optical means.

The light collecting means 107 can be embodied as any optical component capable of collecting light from the light sources and convert the light into light beams and can for instance be optical lenses, light mixers, TIR lenses etc. In the illustrated embodiment the light collecting means 107 are embodied as TIR lenses carried by a holder 108. The skilled person realizes that the TIR lens can be designed according the light output of the light source and the described optical properties of first light beam 109, second light beam 111, a first common light beam 115 and/or second common light beam 117.

The illumination device illustrated in FIGS. 1a and 1b makes it thus possible to provide a multi-colored LED lighting product with a high lumen and also a high CRI.

FIG. 2a-2e illustrates another embodiment of the illumination device 201 according to the present invention. FIGS. 2a and 2c are a cross sectional views of the illumination device respectively along line A-A and B-B and illustrate respectively the light sources 203/205 and the light collecting means 207 in the first and second position. FIGS. 2b and 2d are front views (seen from the converging means 210 as illustrated by arrow A' and B') of the light collecting means 207 respectively in the first position and in the second position. FIG. 2e is a front view of the PCB 204 (seen from the light collecting means 207) whereon the light sources 203/205 are arranged.

In this embodiment the illumination device 201 comprises a number of light sources generating light, the light sources are arranged in a first group of light sources 203 (illustrated as white quadrangles) and in a second group of light sources 205 (illustrated as hatched quadrangles). The light sources are mounted on a PCB 204 (printed circuit board) and the two groups of light sources can be controlled individually for instance by a controller (not shown) as known in the art of lighting. The controller is thus adapted to treat the two groups of light sources as at least two individual groups of light sources which can be individually controlled.

As illustrated in FIG. 2e the first group of light sources 203 and said second group of light sources 205 are distributed around the optical axis 213 and the two groups of light sources are angular displaced around the optical axis in relation to each other. In the illustrated embodiment the angular displacement α around the optical axis between the two groups of light sources is 45 degrees.

In this embodiment a number of light collecting means 207 are arrange/in front of the light sources 203/205 and the light collecting means 207 and light sources 203/205 are movable in relation to each other between a first position and a second position and can be fixed in the first position and in the second position. In the illustrated embodiment the movement between the first position and the second position is performed by rotating the light collecting means 207 around the optical axis 213 while the light sources are fixed in relation to the optical axis 213. The rotation of the light collecting means corresponds to the angular displacement α (in this embodiment 45 degreed) between the first group of light sources and the second group of light sources.

FIG. 2b illustrates that light collecting means 207 in the first position is positioned above the first group of light sources 203 (illustrated by the fact that the first group light sources 203 is visible below the light collecting means 207 while the second group of light sources 205 are hidden). FIG. 2a illustrates that in the first position the light collecting means 207 are adapted to collect light from the first group of light sources 203 and convert the collected light from the first group of light sources into a number of first light beams 209. In this embodiment the light collecting means 207 are embodied an array of four optical lenses 207a-207d which are adapted to collect and collimate the light from first group of light sources into a number of first light beams 209. In the illustrated embodiment the four optical lenses 207a-d are embodied as pie shaped lenses which are constructed as one body of for instance of glass or polymer. The optical lenses are thus arranged adjacent to each other and cover the entire surface of the light collecting means which make it possible to optimize the Etendue of the optical system. It is to be understood that the four lenses can be embodied as any optical component capable of collecting at least a part of the light form the light sources and convert the collected light into light beam. Further the cross sectional shape of the four lenses may have other shapes, for instance circular, polygonal. It is to be understood the light collecting means 207 also may comprise any other number of lenses. Light converging means 210 are positioned after the light collecting means 207 along the optical axis and is adapted to concentrate the first light beams at an aperture 219 positioned further along the optical axis 213. In the illustrated embodiment the light converging means 210 are embodied as a micro Fresnel lens but it is to be understood that the light converging means can be embodied as any optical component capable of concentrating light beams at an aperture. Alternatively the light converging means can be replaced by any optical deflecting means capable of changing the divergence of the light beams for instance in order to created a common light beam having a certain divergence.

In a similar way and as illustrated in FIG. 2d the light collecting means 207 in the second position is positioned in front of the second group of light sources 205 (illustrated by the fact that the second group light sources 205 is visible below the light collecting means 207 while the second group of light sources 203 are hidden). FIG. 2c illustrates, that in the second position the light collecting means 207 are adapted to collect light from the second group of light sources 205 and collimate the collected light from the second group of light sources into a number of second light beams 211 and the light converging means 210 are adapted to concentrate the second light beams 211 at the aperture 219.

The illumination device 201 illustrated in FIG. 2a-2e can be switched very fast between the first and second position as the light sources and light collecting means are moved in relation to each other simply by rotating the light collecting mans and light sources in relation to each other around the optical axis. This is possible as the light sources are distributed round the optical axis and as the first group of light sources and second group of light sources are angular displaced around the optical axis 213 in relation to each other. In the illustrated embodiment the light collecting means and light sources are displaced in relation to each other by rotating the light collecting means 207 only, however the skilled person realize that displacement also can be performed by rotating the light sources 209 only and also by rotating the collecting means and the light sources at the same time; for instance in opposite directions. The skilled person realized further that the rotation of the light collecting means and/or light sources can be performed by an actuator which for instance can be controlled by controlling means.

Further the light sources of each group can be distributed uniformly around the optical axis and light beams will thus also be uniformly distributed around the optical axis, as a consequence the illumination device can be used as a light engine in a rotational symmetric optical system and system.

The illumination can also comprise a projection system (for instance as described in connection with FIG. 3a-3e) arranged along the optical axis. The projecting system can be adapted to change the divergence of the light beams and be used to provide a zoom effect if the projecting system is movable along the optical axis.

Alternatively the projecting system can be adapted to image the aperture at a distance along the optical axis. This makes it possible to position an imaging object approximately at the aperture and thereby create a projected image at a target surface a distance along the optical axis.

It is noted that the light collecting means and the number of light sources also can be movable along the optical axis 213 in relation to each other and that it hereby is possible to create zoom effects. However zoom and focus effects can also be achieve through the projecting system.

Figure 3B:
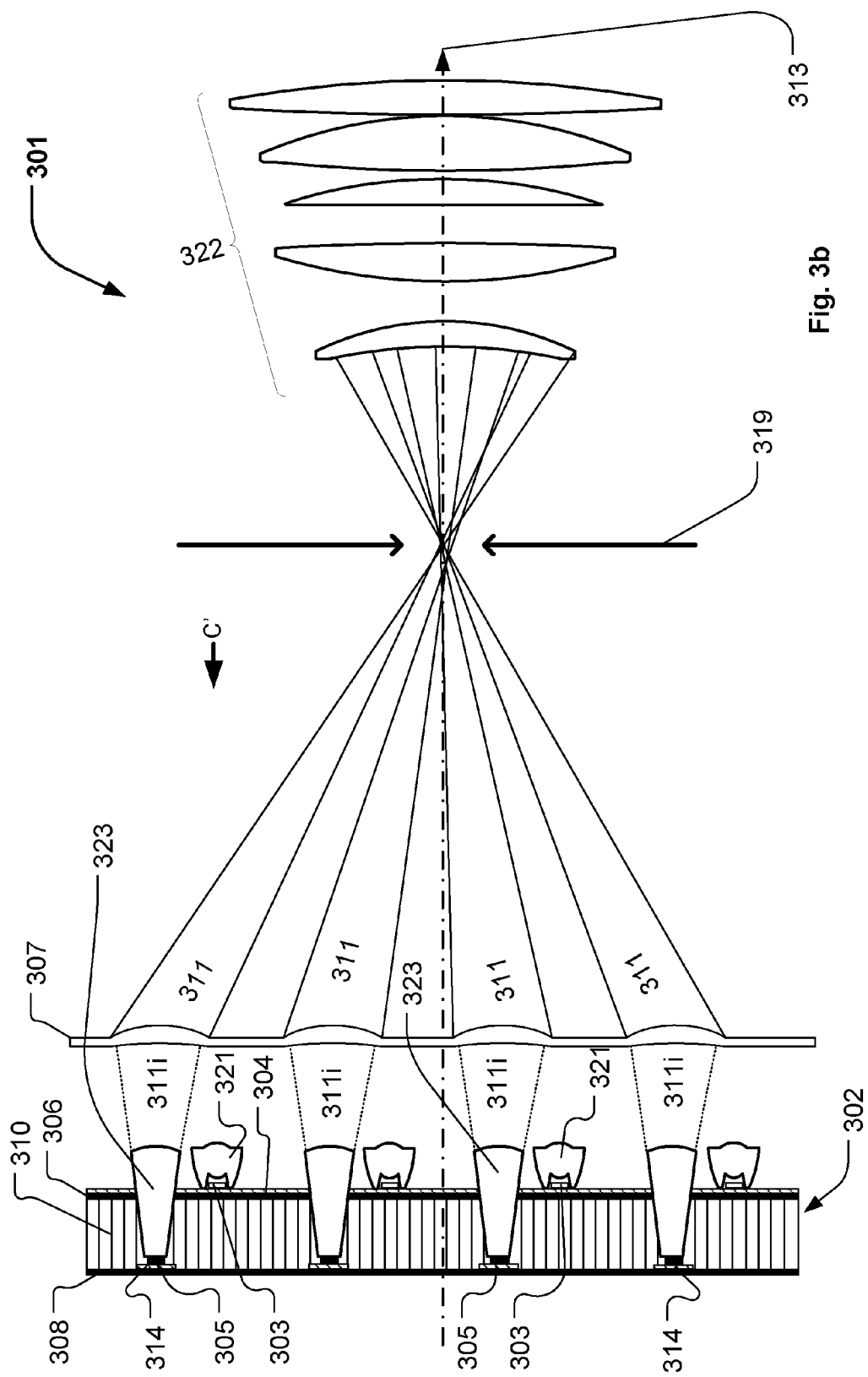
Figure 3E:
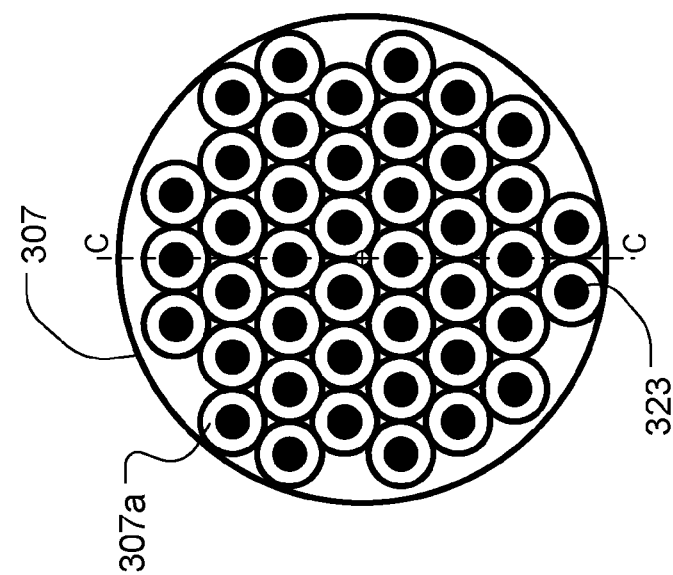
Figure 3D:
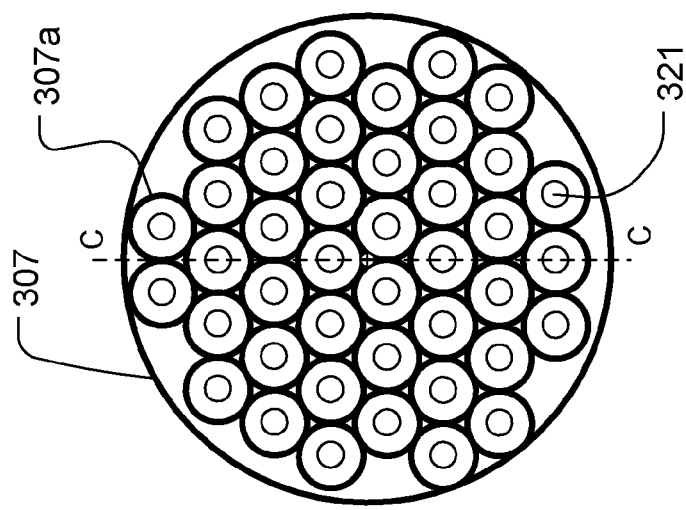
Figure 3C:
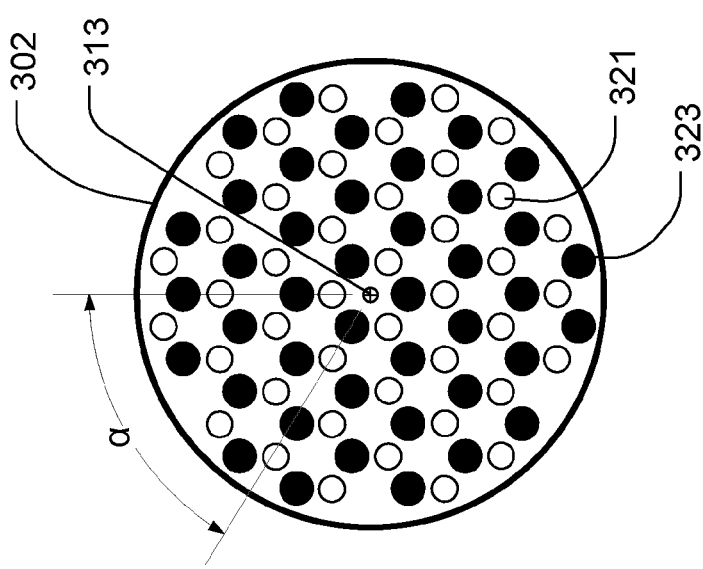

FIG. 3a-3e illustrate another embodiment of an illumination deceive 301 according to the present invention. FIGS. 3a and 3b are simplified cross sectional views along line C-C in respectively FIGS. 3d and 3e and illustrate the light sources 303/305 and the light collecting means 307 respectively in the first position and in the second position. FIG. 3c is a front view (seen from the light collecting means 307) of the heat sink 302 whereon the light sources 303/305 are arranged. FIGS. 3d and 3e are front views (seen form the aperture 319 in the view direction indicated by arrow C') of the light collecting means 307 respectively in the first position and in the second position.

In this embodiment and similar to the illumination devices described above the light sources are arranged in a first group of light sources 303 (illustrated as white quadrangles) and in a second group of light sources 305 (illustrated as black quadrangles). A number of light collecting means 307 are arrange above the light sources 303/305 and the light collecting means 307 and light sources 303/305 are movable in relation to each other between a first position and a second position and can be fixed in the first position and the second position.

In this embodiment the light sources are arranged on a heat sink 302 comprising a first cooling plate 306 and a second cooling plate 308 separated by a distance and defining a flow channel allowing cooling fluid to flow between the first 306 and the second cooling plate 308. The heat sink comprises further at least one light passage allowing light to propagate from the second cooling plate 308, towards the first cooling plate 306 and through the first cooling plate 306. This makes it possible to construct a compact light engine where the large number of light sources can efficiently be cooled. This is achieved as the light sources are mounted on different cooling plates and at the same time are adapted to emit light in the same direction. In the illustrated embodiment the first 306 and second 308 cooling plates can be interconnected by a number of cooling fins 310 protruding into the flow channel. The cooling fins are adapted to allow the cooling fluid to flow at least partially between the first and second cooling plate and for instance be embodied as pin fins, folded fins, flat fins etc. The cooling fins can be embodied as separate objects which are thermally connected to the first and/or second cooling plates. However it is also possible to provide the cooling plates and cooling fins as integrated objects; for instance by molding two identical plates comprising a number of protruding cooling fins. The heat sink can be constructed by mounting the two cooling plates in a sandwich construction such the cooling fins of the two plates are interconnected. The result is a very compact light engine where many light sources can be mounted at the same heat sink and be adapted to emit light in substantial the same direction. This is achieved by arranging a number of light sources on the first cooling plate and by arrange a number of light sources to the second cooling The light from the light sources mounted at the first cooling plate are adapted to emit light in a direction away from the first cooling plate and the light sources mounted on the second cooling plate are adapted to emit light in a direction towards and through the first cooling plate, as the light passage allows the light form the light sources at the second cooling plate to pass through the heat sink and through the first cooling plate. This can be achieved by providing the first cooling plate with apertures/holes arrange above the light sources at the second cooling plate and the light generated by the light sources at the second cooling plate can thus escape through these apertures. In embodiments comprising cooling fins the cooling fin comprises also a number of apertures. The result is that the generated light can be emitted in approximately the same direction and all light sources can be efficiently cooled as heat from all light sources can dissipate through the first and second cooling plate and removed by cooling fluid flowing in the flow channel. The heat can further be dissipated into the cooling fins extending into the flow channel which improves the cooling as the contact surface between the heat sink and the cooling fluid is increased. It is noted that the person skilled in the art of cooling system can design the cooling fins in many ways in order to remove as much heat as possible. The cooling fluid can for instance be air or liquid which flows through the flow channel. The flow can be initiated by convection, gravity and/or by mechanical means like blowing means and pumps forcing the cooling fluid through the flow channel. It is also possible to provide cooling fins (not shown) which protrudes backwards from the second cooling plate and such cooling fins can be used to dissipate heat from the second group of light sources as known in the art. The heat sink may be embodied as described in the patent application tilted "ILLUMINATION DEVICE WITH MULTI-LAYRED HEAT SINK" and filed by the applicant, Martin Professional in Denmark on 10 Jun. 2011 under application number DK PA 2011 70291 or as described in the PCT application titled "ILLUMINATION DEVICE WITH MULTI-LAYRED HEAT SINK" and filed by the applicant, Martin Professional in Denmark on 8 Jun. 2012 under application number PCT/DK2012/050196.

In the illustrated embodiment the first group of light sources 303 are arrange on a PCB 304 mounted to the first cooling plate 306. The heat from the first group of light sources 303 can thus be dissipated backwards through the first cooling plate 306 and the cooling fins 310 and be removed by the cooling fluid flowing in flow channel defined by the first and second cooling plate. The second group of light sources 305 are arrange on a number of PCBs 312 mounted to the second cooling plate 308. The heat from the second group of light sources 305 can thus be dissipated forwardly through the second cooling plate 306 and the cooling fins 310 and be removed by the cooling fluid flowing in flow channel defined by the first and second cooling plate. It can be seen that cooling fins 310 are in thermal contact with the second cooling plates 308 at areas between the numbers of PCBs 312; however the skilled person realizes that alternatively the PCBs 312 can be embodied as one piece with a number of holes where through the cooling fins 310 can be lead to the second cooling plate.

The illumination device 301 comprises further first intermediate light collecting means 321 positioned above the first group of light sources 303 and adapted to collect light form the first group of light sources and create a number of first intermediate light beams 309i (in FIG. 3a). The first intermediate light collecting means 321 are stationary mounted above the first group of light sources and embodied as a number of TIR lenses. In the first position the light generated by the first light sources 303 will thus be converted into a number of first intermediate light beams 309i before being collected and converted into first light beams 309 by the light collecting means 307. The first group of light source are embodied single color LEDs or white LEDs.

The illumination device comprises also second intermediate light collecting means 323 arranged in the light passages of the heat sink and above the second group of light sources 305. In the illustrated embodiment the second intermediate light collecting means 323 are embodied as optical light mixers rods adapted to collect and mix light from the second group of light sources. The second groups of light sources are embodied as multi-die LEDs and the optical light mixers serve to mix the light form the multi-die LEDs to a homogeneously light beam. In the second position the light generated by the second light sources 303 will thus be converted into a number of second intermediate light beams 311i before being collected and converted into second intermediate light beams 311 by the light collecting means 307.

The illustrated illumination device 301 is embodied as a projecting illumination device and light collecting means 307 are thus adapted to focus the first light beams 309 and second light beams 311 at an aperture 319 positioned along the optical axis 313. Further a projection system 322 is arranged along the optical axis 313 and adapted to image the aperture 319 at a distance along the optical axis. This makes it possible to position an imaging object (not shown) approximately at the aperture and thereby create a projected image at a target surface a distance along the optical axis. The projecting system 322 can be moved along the optical axis 313 which makes it possible to focus the image at different distances, as known in the art of zoom and focusing systems.

However it is to be understood that the illumination device alternatively can be embodied as a wash/flood light where the light collecting means 307 are adapted to create a common light beam from the first light beams 309 or the second light beams 311. Further the projection system 322 can be replaced by a zoom system adapted to change the divergence of the common light beam.

FIG. 3c is a front view of the heat sink 302 where the first group 303 and the second group 305 of light sources are arranged. The light from the first group of light sources are emitted from the exit surface (illustrated as white circles) of the first intermediate light collecting means 321 and the light from the second group light sources are emitted from the exit surface (illustrated as black circles) of the second intermediate light collecting means 323. The light sources are arranged in an array and the two groups of light sources are distributed between each other. The two groups are further angular displaced around the optical axis 313 in relation to each other. The angular displacement α between the first group of light sources and the second group of light sources is 45 degrees, however the skilled person will realize that the first and second group of light sources can be angular displaced in relation to each other at any angle.

FIG. 3d illustrates that in a first position the light collecting means 307 are positioned above the first intermediate light collecting means 321 (illustrated by the fact that the exit surfaces of the first intermediate light collecting means are visible below the light collecting means 307 while the exit surface of the second intermediate light collecting means 323 are not visible). Similar in the second position illustrated in FIG. 3e the light collecting means 307 are positioned above the second light collecting means 323 (illustrated by the fact that the exit surface of the second intermediate light collecting means 323 are visible below the light collecting means 307, while the exit surface of the first intermediate light collecting means are not visible). From the first position in FIG. 3d to the second position in FIG. 3e the light collecting means 307 are rotated counter clockwise rotated around the optical axis 313 at an angle corresponding to the angular displacement α between the two groups of light sources. As a consequence the collecting means 307a are moved from its position indicated in FIG. 3d to its position indicated in FIG. 3e. The first intermediate light collecting means and second intermediate light collecting means can be designed such that the first intermediate light beams 309i and second intermediate light beams 311i has approximately the same beam diameter and diverges when they hit the light collecting means 307. The result is that the light beams leaving the light collecting means 307 will be substantial identical for the first and second position and the optical properties further along the optical axis can thus be the same which results in a very compact illumination device.

Figure 4A:
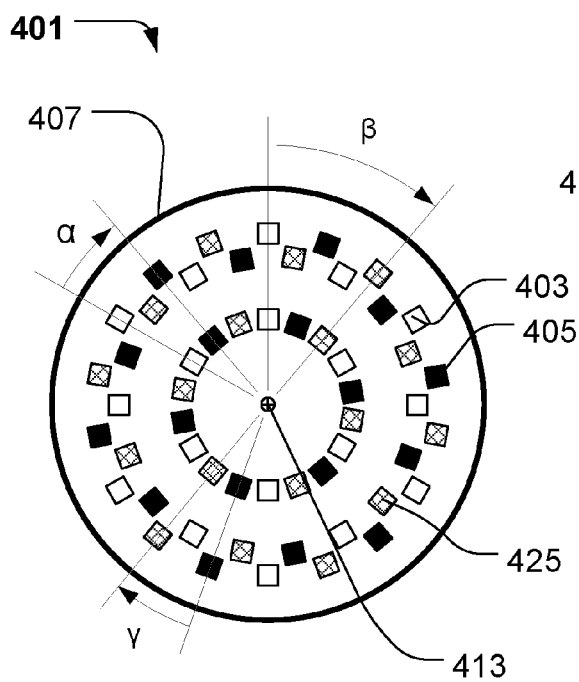
FIG. 4*a*-4*d* illustrate another embodiment of an illumination device according to the present invention.

FIG. 4a-4d illustrate another embodiment of an illumination device 401 according to the present invention. FIG. 4a is a front view of the light sources and illustrates that the light sources are arranged in a first group 403 (in white quadrangles), a second group 405 (in black quadrangles) and a third group 425 (in hatched quadrangles) of light sources. The three groups of light sources are angular displaced in relation to each other around the optical axis 413. The angular displacement α of the second group light sources in relation to the first group light sources 403 are 20 degrees in the clockwise direction, while the angular displacement 13 of the third group of light sources in relation to the first group of light sources is 40 degrees in the clockwise direction (alternatively 20 degrees in the counter clockwise direction). The angular displacement γ of the third group light sources in relation to the second group light sources is 20 degrees in the clockwise direction.

Figure 4B:
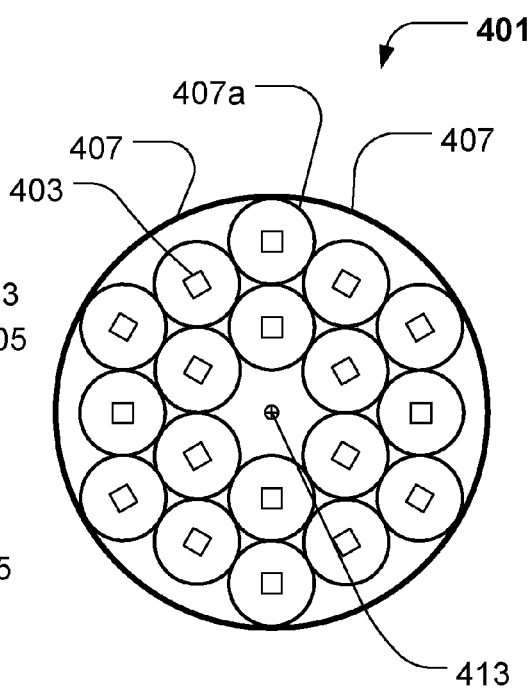
Figure 4C:
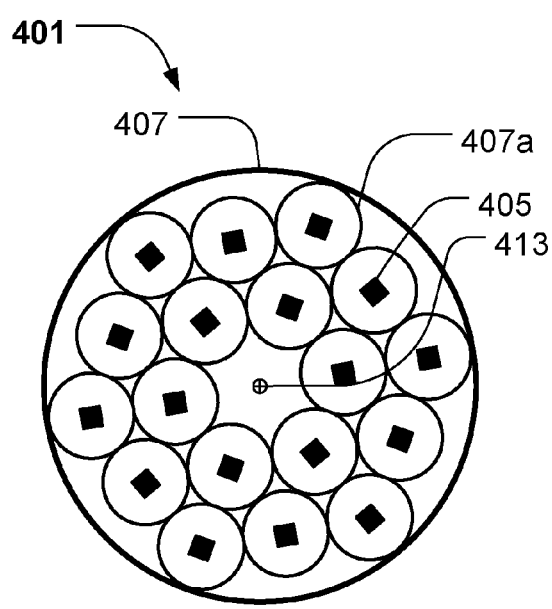
Figure 4D:
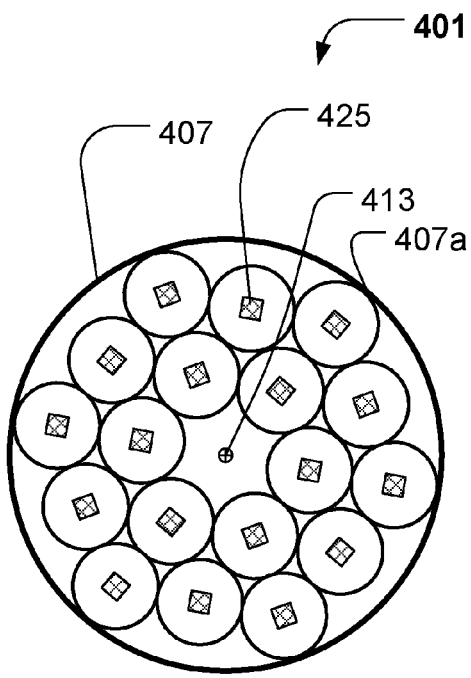

In this embodiment the light sources and the light collecting means 407 can be moved between a first, a second and a third position and FIGS. 4b, 4c and 4d illustrate a front view of the illumination device respectively in the first, the second and the third position. In the first position illustrated in FIG. 4b the light collecting means modify light from the first group of light sources which is illustrated by the fact that only the first group light sources 403 is visible below the light collecting means. Similar in the second and third position illustrated in respectively FIGS. 4c and 4d the light collecting means 407 modify light from the second group 405 and third group of light sources 425. For instance the light collecting means 407 are rotated 20 degrees in the clockwise direction from in FIG. 4a to FIG. 4b. This can be seen by the fact that the light collecting means 407a is moved. Further the light collection means are rotated another 20 degrees in the clockwise direction from FIG. 4b to FIG. 4c. This is also illustrated by the fact that the light collecting means are moved further. Rotating the light collecting means another 20 degrees in the clockwise direction in FIG. 4c will move the light collecting means 407 into a forth position which correspond to the first position.

The illumination devices illustrated in FIG. 2-4 are illustrated without having a light sources arranged at the center and at the optical axis. However, it is to be understood that it is possible to arrange an additional central light source (not shown) at the center and at to optical axis. The light collecting means can be supplied with additional central light collecting means adapted to collect and convert light form the central light source into a central light beam. However due to the central position the light collecting means will as a consequence collect light from the central light source in both the first and second position. The central light source can thus be used in both the first and second mode of operation and for instance be used to add further light to the common light beam. The central light source can be controlled as a separate individual controllable light source and can also form a part of the first and/or second group of light sources.

Figure 5:
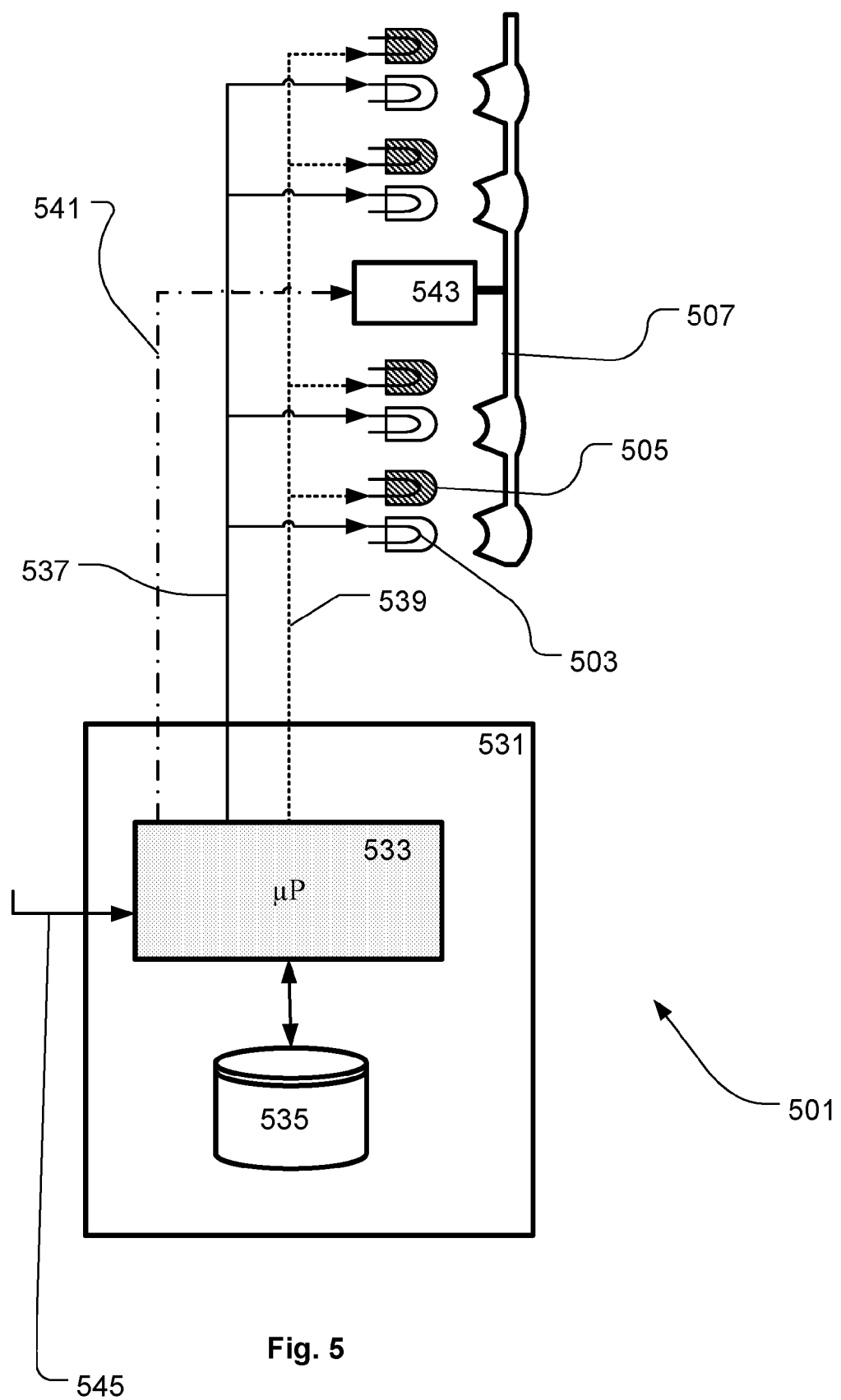
FIG. 5 illustrates a block diagram of an illumination device according the present invention.

FIG. 5 illustrates a block diagram of an illumination device 501 according to the present invention. As described above the illumination device 501 comprises a number of light sources arranged in a first group of light sources 503 (white) and in a second group of light sources 505 (hatched) as and light collecting means 507. The illumination device comprises further a control unit 531 comprising a processor 533 and a memory 535. In the block diagram the light collecting means are positioned in the first position above the first group of light sources.

The processor acts as controlling means and is adapted to control the first group of light sources 503 and the second group of light sources 505 respectively through communication means 537 (in solid lines) and 539 (in dotted lines). Meaning the processing means can control one of the groups of light sources without controlling the other group of light sources. The controlling can for instance be adapted to control the color and/or intensity of the light sources and can be based on any type of communication signals known in the art of lightning e.g. PWM, AM, FM, binary signals etc. The first 503 and the second 505 group of light sources can thus be controlled individually and independently of each other and can thus be treated as two individually and independently groups of light sources. It is to be understood that the individually light sources of each groups can be controlled by the same control signal, supplied with individual control signals and/or grouped in sub-groups where each subgroup receive the same control signal. The communication means 537 and 359 is illustrated as a three connections divided into the individual light sources, however the skilled person will be able to construct many embodiments of the communication means, for instance the group of light sources may be coupled in series or in parallel.

Alternatively both groups of light sources can be connected to the same data bus and controlled by the controller through a data bus using addressing. Further the controlling means is adapted to control the light collector through communication means 541 (in dashed-dotted line) by sending instructions to an actuator 543 adapted to move the light collecting means between the first and second position.

Further the controlling means is adapted to instruct the actuator to fix the light collecting means in the first and second positions. The actuator can be implemented as a step motor.

In one embodiment the controlling means is adapted to control the first group of light sources, the second group of light sources and the light collecting means 507 based on an input signal 545 indicative of a number of controlling parameters as known in the art of entertainment lighting. The input signal 545 can be any signal capable of communicating parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006) or ARTnet.

The controlling means can be adapted to switch the illumination device between a first mode of operation and a second mode of operation. In the first mode of operation the light collecting means 507 and the light sources are arranged and fixed in the first position and the controlling means are adapted to control the first group of light sources while turning off the second group of light sources. In contrast hereto in the second mode of operation the light collecting means and the light sources are arranged and fixed in the second position and the controlling means are adapted to control the second group of light sources while turning off the first group of light sources. The input signal can be indicative of the mode of operation and the controlling means can be adapted to switch mode of operation based on the input single.

FIG. 6a-6d illustrate a simplified cross-sectional view of an embodiment of an illumination deceive 601 according to another aspect the present invention. FIG. 6a-6d illustrate the light collecting means and light sources in respectively a first position, a first mixing position, a second mixing position and in a second position.

The illumination device 601 comprises a number of light sources generating light, the light sources are arranged in a first group of light sources 603 (illustrated as white quadrangles) and in a second group of light sources 605 (illustrated as hatched quadrangles). In this embodiment the light sources are mounted close together for instance as LEDs on a PCB, surface mounted LEDs, chip on board LEDs, OLEDs or other illuminating surfaces. A number of light collecting means 607 are arrange in front of the light sources 603 and 605. In this embodiment each light collecting means are embodied as an optical light mixer, which is adapted to collect and mixed the collected light into a homogenized and uniform light beam.

Like in the embodiments described above the light collecting means 607 and light sources 603/605 are movable in relation to each other between a first position (illustrated in FIG. 6a) and a second position (illustrated in FIG. 6d). Where, in the first position the light collecting means 607 are adapted to collect light from the first group of light sources 603 and to mix the collected light into a number of homogenized and uniform first light beams 609. Similar in the second position the light collecting means 607 are adapted to collect light from the second group of light sources 605 and mix the collected light into a number of homogenized and uniform second light beams 611.

In this embodiment the light sources and the light collecting means can be further positioned in a number of mixing positions (illustrated in FIGS. 6b and 6c) in relation to each other. Where, in the mixing positions, the light collecting means collect at least a part of the light from both the first group and the second group of light sources and mixed the collected light into a number of homogenized and uniform mixed light beams. As a consequence the mixed light beams comprise light from both the first group and second group of light sources.

FIG. 6b illustrates a first mixing position where each light collecting means 607 are positioned above/in front of at least a part of a first group light source 603 and at the same time also above/in front of at least a part of a second group light source 605. Each light collecting means collect thus light from both groups of light sources and mixes the collected light into a number of first mixed light beams 651. In the first mixing position the light collecting means 607 are positioned over/in front of a larger part of the first group of light sources than the part of the second group of light sources. As a consequence the light collecting means will collect more light from the first group of light sources than from the second group of light sources and the mixed light beams 651 comprises thus a larger part of light form the first group of light sources than from the second group 605 of light sources.

This is illustrated by the fact that the light beams 651 are illustrated as dashed lines with relatively long dashes.

In contrast hereto FIG. 6c illustrates a second mixing position where the light collecting means 607 are positioned over a larger part of the second group of light sources than over the part of the first group of light sources. In the second mixing position the light form the first and second group of light sources is thus mixed into a number of second mixed light beams 653 comprising a larger part of light form the second group of light sources than from the first group of light sources. This is illustrated by the fact that the light beams 653 are illustrated as dashed lines with relatively short dashes.

This embodiment makes it possible to provide at number of homogenized and uniform mixed light beams where the homogenized and mixed light beams are constructed by combining light form two group of light sources. The mixing ratio defines how much light form the different groups of light sources that are uses in the homogenized and mixed light beams and can be varied by moving the light sources and the light collecting means in relation to each other. The light from the two groups of light sources can thus be mixed as known in the art of additive light mixing by moving the light collecting means and light sources in relation to each other. A uniform and homogenized light beam may be defined as a light beam where the cross sectional light distribution of different spectral components is substantially identical and where the beam diverges of different spectral components is substantially identical.

For instance it is possible to provide an additive color mixing illumination device by providing the first group and second group of light sources with different spectral distribution for instance resulting different in colors or color temperatures. In the first position (FIG. 6a) the illustrated illumination device 601 will create a number of light beams having the color of the first group of light sources, as in this position the light collecting means 607 will collect substantially light from the first group of light sources only. In the first mixing position (FIG. 6b) the illumination device 601 will create a number of first mixed light beams 651 having a first mixed color which is created by a combination of light from the first and second group of light sources. The first mixed color is more like the color of the first group of light sources, as the first mixed light beams comprises at larger part of light from the first group of light sources. Similar in the second mixing position (FIG. 6c) the illumination device will create a number of second mixed light beams 653 having a second mixed color where the second mixed color is more like the color of the second group of light sources than like the color of first group of light sources, as the second mixed light beams comprises a larger part of light from the second group of light sources. In second position (FIG. 6d) the illustrated illumination device 601 create a number of light beams having the color of the second light sources, as in this position the light collecting means 607 will collect substantially light from the first group of light sources only.

The illustrated illumination device makes it possible to provide a color changing apparatus with very bright single colors like red, green and blue colors and also a very bright white light. This is achieved as the Etendue limit can be optimized for the single colors as the light collecting means in these positions collects light from only one kind of light sources.

It is to be understood that more than two groups of light sources can be used and that the light colleting means in these embodiment are adapted to be positioned in different mixing positions where the light collecting means collects different ratios of light form different groups of light sources. For instance illustrated in FIG. 7a-7k and described below.

FIG. 7a-7k illustrate and embodiment of an illumination device according to the present invention. Like the illumination devices described above this illumination device comprises a number of light sources generating light and number of light collecting means 707a-g movable in relation to each other between a numbers of positions where the light collecting means and light sources can be fixed in relation to each other.

Figure 7A:
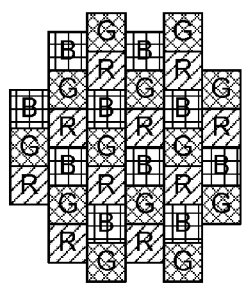
FIG. 7*b*-7*k* illustrate another embodiment illumination device according to the present invention.
Figure 7B:
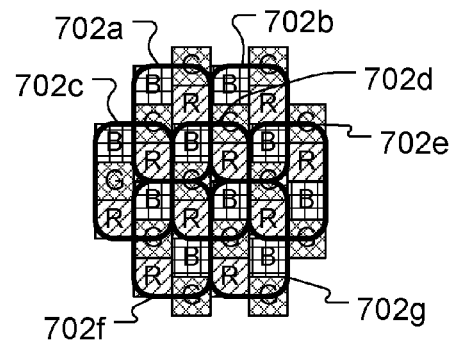

FIGS. 7a and 7b illustrate a top view of the light sources. The light sources are arrange in a first, a second and a third group of light sources where the first group comprises RED light sources R (illustrated as hatched quadrangles), the second group comprises GREEN light sources G (illustrated as cross hatched quadrangles) and the third group comprises BLUE light sources B (illustrated as square hatched quadrangles). The light sources are arranged in an array where each light source of each group is arranged adjacent to at least one light source of the two other groups. As a consequence:

each RED light source has at least one BLUE and one GREEN light source as neighbors;
each GREEN light source has at least one BLUE and one RED light source as neighbors;
each BLUE light source has at least one RED and one GREEN light source as neighbors.

Further the light sources are arranged in a number of clusters 702a-702g illustrated in. FIG. 7b as transparent quadrangles with round corners in order to make it easier to identify each cluster. The clusters are arranged in a regular pattern; meaning that the center of the clusters are separated with substantial same mutual distance. Each cluster comprises a number of light sources from each group of light sources and the light sources are further arranged in identical patterns within each cluster. In this embodiment some of the clusters are overlapping each other and share some of the light sources for instance it can be seen the cluster 702a share light sources with clusters 702c and 702d. However this might not be the case in other embodiments and the clusters may also be separated by a distance.

FIGS. 7c, 7e, 7g and 7i illustrate top views of the light collectors 707 and show the light collectors 707a-g in different positions in relation to the light sources. The exit surface of the light collectors are illustrated as circles and it is possible to see through the light collectors 707a-g and see the light sources R, G, B below the entrance surfaces (illustrated as squares) of the light collectors. FIGS. 7d, 7f and 7k illustrate a cross sectional views along line D-D of FIGS. 7c, 7e and 7g respectively; FIGS. 7j and 7k are a cross sectional views respectively along line E-E and F-F of FIG. 7i.

The light collectors 707a-g are arranged in a regular pattern above/in front of the light sources (R, G and W) and the regular pattern regulate is substantially identical to the regular pattern of the clusters. Each light collector 707a-707g is adapted to collect light from the light sources of a corresponding cluster and mix the converted light into a mixed light beam 755a-755e (the mixed light beams from light collector 707f and 707g are not shown). In this embodiment the light collectors 707a-g will respectively collect light from cluster 702a-g. The light collecting means 707a-g and light sources (R, G and W) can be moved in relation to each other in a range allowing each light collector 707a-g to collect light from all parts of the corresponding cluster 702a-g. In other words the light collecting means and light sources are displaceable in relation to each other allowing the light collector 707a-707g to collect light from different parts of a corresponding cluster 702a-702g. Each light collector will collect substantially identical light because the light collecting means are arrange in the same pattern as the clusters and because the light sources are arrange in identical patterns within the clusters.

The light collectors 707a-707g are further embodied as optical light mixers carried by holder 706. The holder 706 is adapted to carried the light collectors and areas around the light collectors is embodied as a non transparent material and can thus block light from light sources emitting light outside the light collectors. The optical light mixers are adapted to mix the collected into a mixed light beams 755a-755e (the mixed light beams from light collector 707f and 707g are not shown) being homogenized and uniform. The light mixers can for instance be embodied as described in the patent application filed in Denmark by the applicant on 23 Dec. 2010 under application number DK PA 2010 70580 or the PCT patent application filed in Denmark by the applicant on 25 Nov. 2011 under application number PCT/DK2011/050450. Both in cooperated herein by reference. In the illustrated embodiment the mixed light beams are further collimated and propagate substantially parallel with the optical axis 713. As a consequence it is possible to concentrate the mixed light beam at an aperture 719 along the optical axis 713 independently of the positions of the light sources in relation to the light collectors. This is achieved by arranging optical convening means 710 between the light collecting means 707a-707g and the aperture 713. The optical convening means 710 can be embodied as any optical component(s) capable of focusing the collimated mixed light beams 755a-755e at the aperture for instance by arranging the aperture 719 are at the focal point of the optical components. In this embodiment the light sources are fixed in relation to the optical axis 713, the optical convening means 710 and the aperture 719 whereas the light collectors are movable in relation to the light sources e.g. for instance by connecting the holder 708 to an actuator (not shown). The light collectors can thus be moved and positioned in different positions in relation to the light sources; however it is to be understood it is also possible to move the light sources in relation to the light collecting means while fixing the light collectors or to moving both the light collectors and light sources at the same time.

Figure 7C:
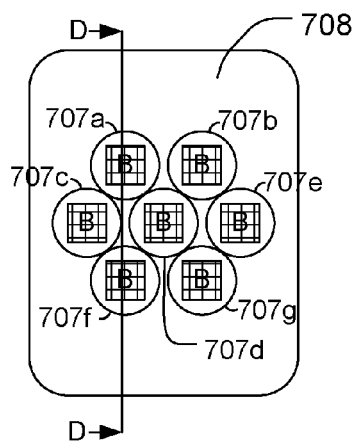
Figure 7D:
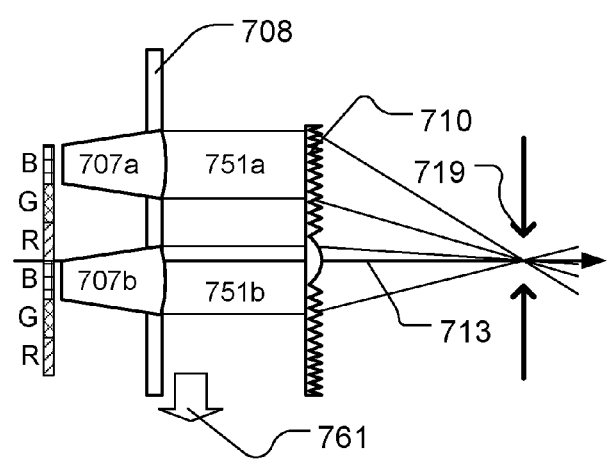

FIGS. 7c and 7d illustrate the light sources and the light collecting means in a position where the light collectors collect light form a BLUE light source B and the holder 708 will block for light emitted by RED and GREEN light sources. The mixed light beams 751a and 751b will thus be blue whereby the aperture 719 is illuminated by blue light. A gobo as known in the art entertainment lighting can thus be positioned at the aperture and be imaged at a target surface by a projecting system (not shown). The skilled person will understand that in this position the RED and GREEN light sources R and G may be turned off without effecting the outgoing light beam for instance in order to save energy.

Figure 7E:
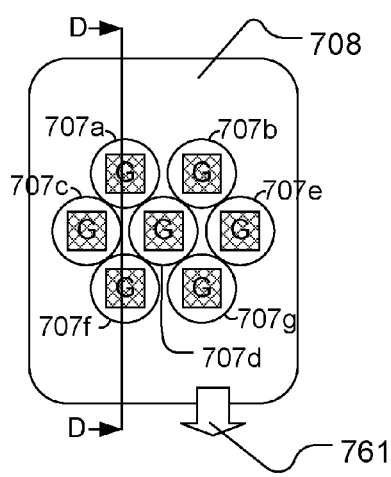
Figure 7F:
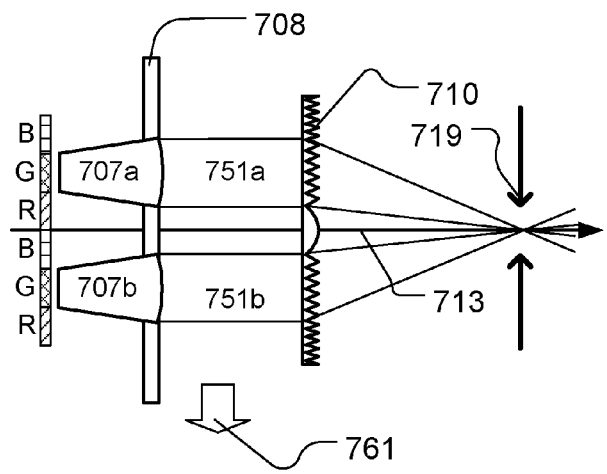

FIGS. 7e and 7f illustrate the light sources and the light collecting means in a position where the light collectors collect light from a GREEN light source and the holder 706 will block for light emitted by RED and BLUE light sources. The mixed light beams 751a and 751b will thus be green. From the position shown in FIGS. 7c and 7d the light collecting means have been move a distance corresponding to the size of the BLUE and GREEN light sources and in a direction as indicated by arrow 761.

FIGS. 7g and 7h illustrate the light sources and the light collecting means in a position where the light collectors collect half of the light from a GREEN light source and a half of the light from the RED light source, as the input surface is positioned approximately over half of the RED and GREEN light sources. The holder 706 will block for light emitted by BLUE light sources and emitted by the other half of the RED and GREEN light sources. In this position the mixed light beams 751a and 751b will thus be a combination of red and green light which will be yellow. From the position shown in FIGS. 7e and 7f the light collecting means have been move a distance corresponding to the half size of the GREEN and RED light sources and in a direction as indicated by arrow 763

FIGS. 7i, 7j, and 7k. illustrate the light sources and the light collecting means in a position where the light collectors collect light from the GREEN, RED and BLUE light source. In this position the light collecting means will collect light from one half of the surface area of the BLUE light sources and quarter of surface area of the RED and GREEN light sources. In this position the mixed light beams 751a and 751b will thus be a combination of red, green and blue light with approximately twice as much blue light as red and green light and results in bright blue light. From the position shown in FIGS. 7g and 7h the light collecting means have been move a distance corresponding to the half size of the light sources and in a direction as indicated by arrow 765.

The four positions illustrated in FIG. 7c-7k are just a few examples of a large number of positions in which the light sources and the light collecting means can be positioned and fixed in relation to each other. The skilled person realize that the light sources and light collectors can be positioned in many different positions where the light collectors collect different ratios of the light emitted by the different type of light sources whereby many different colors of the mixed light beams can be created. In the embodiment illustrated in FIG. 7a-7k the different types of light sources are illustrated as having same size and emitting the same amount of light pr. surface area. However it is to be understood that the different kind of light sources may have different size and emitted different amount of light and that the displacement of the light sources and the light collecting means in such situations can be adapted to create a predetermined color of the mixed light beams when the light collecting means and light sources are position in certain positions in relation to each other.

In the illustrated embodiments the optical light mixers are formed of a solid transparent material, where light enters said optical light mixer through an entrance surface and is reflected through said body to an exit surface where the light exit the optical light mixer. The light mixers can be formed as described in the patent application filed in Denmark by the applicant on 23 Dec. 2010 under application number DK PA 2010 70580 or the PCT patent application filed in Denmark by the applicant on 25 Nov. 2011 under application number PCT/DK2011/050450. Both in cooperated herein by reference. It is to be understood that the light mixers can be formed as any known light mixer for instance as described in US2007/0024971, U.S. Pat. No. 6,200,002, U.S. Pat. No. 6,547,416 WO10113100A, WO10113101 also in-cooperated herein by reference.

It is further possible to combine the mechanical color mixing as described in FIG. 7a-7k with a traditional additive color mixing where the intensity of the different groups of light sources are varied relatively to each other electronically (such as AM, DC; PWM based systems system). In some situations it might be more energy efficient to provide color mixing using the mechanical color combining system while in other situations it may be more efficient to use the electronic color varying system.

It is also possible to provide the four groups of light sources where the first, second, third and fourth group of light sources respectively comprises red, green, blue and white LED. In this way a RGB-W illumination device can be created by adapting the light collecting means and light sources to be displaced in relation to each other in different positions where the light collecting means collects different ratios of light from the four groups of light sources. IT is to be understood that any number of different colored light sources can be combined.

Figure 8A:
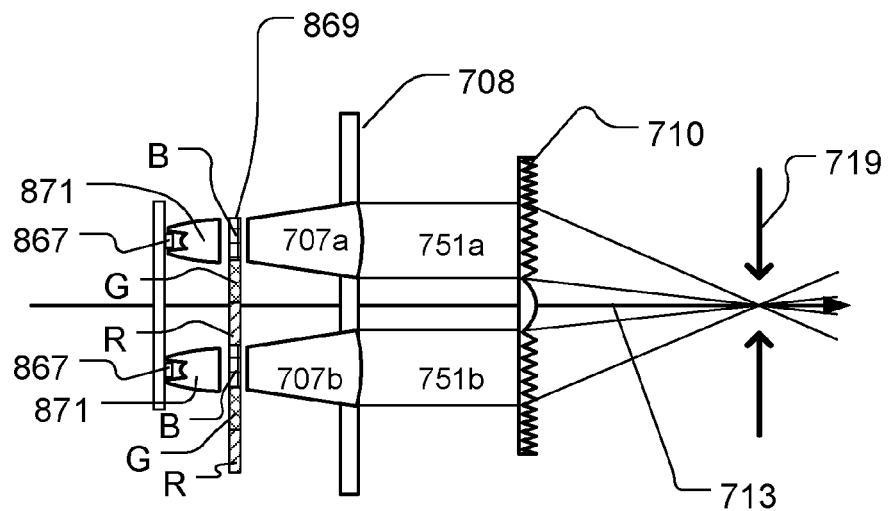
FIG. 8a-8c illustrate another embodiment of an illumination device according to the present invention.
Figure 8B:
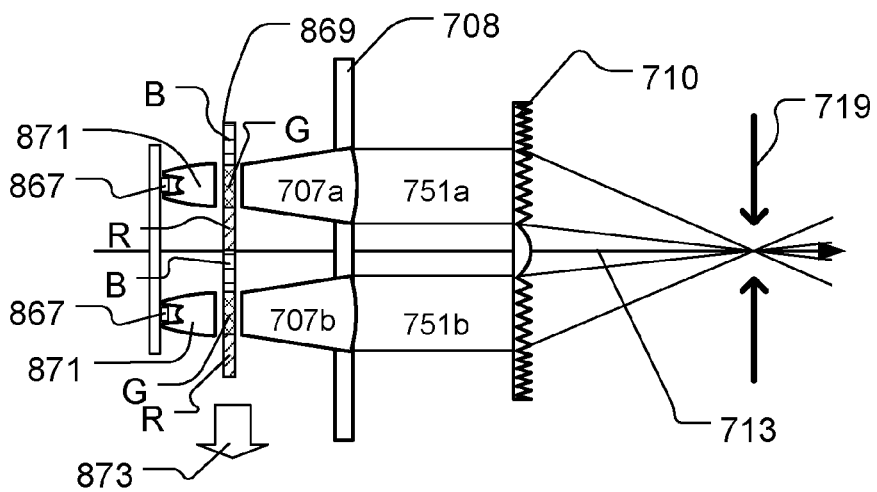
Figure 8C:
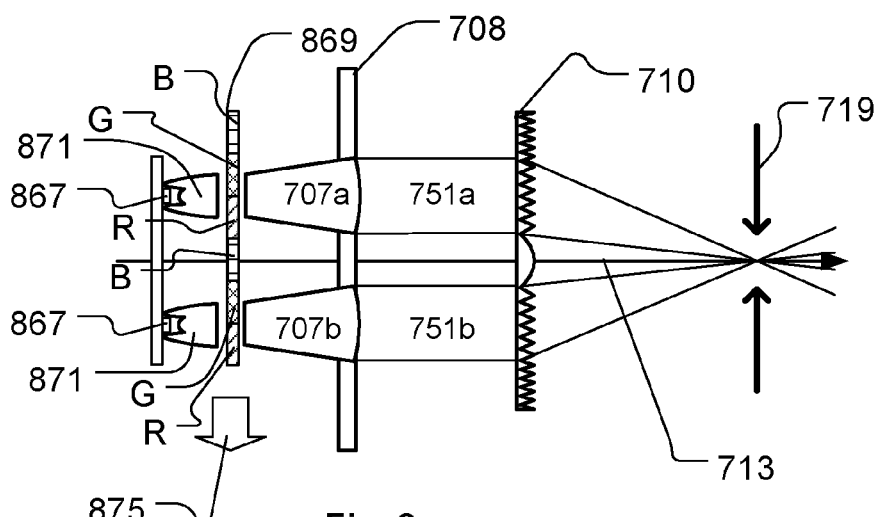

FIG. 8a-8c illustrates another embodiment of an illumination device according to the present invention and illustrates cross sectional views similar to the cross sectional view of FIGS. 7d, 7e and 7h. In FIG. 8a-8c features substantially identical to features in FIG. 7a-7k are labeled with the same reference numbers as in FIGS. 7d, 7e and 7h and additional/different features are described below. The light collecting means 707 are embodied as described in connection with FIG. 7a-7k above but fixed in relation to the optical axis 713, the optical converging means 708 and the aperture 719. In this embodiment the light sources are based on light converting materials where a number of pumping light sources 867 are adapted to illuminate a converting material where the converting material is adapted to convert the pumping light illuminated by the pumping light sources into light having different wavelengths. The pumping material can for instance be made of different phosphor compounds as known in the art of phosphor converting materials. The pumping light sources can be light sources emitting UV light which is converted into visible light by the converting materials. However the pumping light can be any type of light which is capable of being converted by the converting material.

In this embodiment a converting plate 869 comprising a number of converting areas comprising different converting material are arranged between the pumping light sources 867 and the light collecting means 707. The converting plate comprise RED areas R (in hatched quadrangles) adapted to convert the pumping light into RED light, GREEN areas G (in cross hatched quadrangles) adapted to convert the pumping light into GREEN light and BLUE areas B (in squared quadrangles) adapted to convert the pumping light into BLUE light. The RED, GREEN and BLUE areas are arrange in a pattern identical to the light sources illustrated in FIG. 7a and also arranged into clusters as illustrated in FIG. 7b.

In the illustrated embodiment the pumping light from the pumping light sources 867 is collected by a pumping light collector 871 adapted to concentrate the pumping light at the converter 869 plate and at an area having nearly the same area as the entrance surface of the light collecting means 707. The result is that most of the pumping light will be converted by the converting material at an area in front of the light collector and most of the converted light will thus be collected by the light collecting means 707.

The pumping light will thus be converted by the converting materials where after the converted light are collected by light collecting means 707 and converted into a number of mixed light beams. In this embodiment the light collecting means are embodies as light mixers and the number at converted light means are thus mixed light beams as described in connection with FIG. 7a-7e.

The converting plate 869 can be moved in relation to the pumping light sources 869 and in relation to the light collecting means 707 whereby different areas of the different light converting material can thus be positioned below the entrance surface light collectors. As a consequence the light collectors will collect converted light having different colors when the converter plate is moved in relation to the light collectors 707.

In FIG. 8a the converter plate 869 are positioned such the BLUE converter areas B are positioned below the light collecting means 707a,707b and the resulting mixed light beams 751a-751b will in this position be blue. In FIG. 8b the converter plate have been moved as illustrated by arrow 873 whereby the GREEN converter areas are placed below the light collectors and the resulting mixed light beam are green. In FIG. 8c the converter plate have been moved as illustrated by arrow 875 and is positioned such that both GREEN and RED converter areas are positioned below the light collectors. In this position the light collectors 707a,707b will thus mix the converted green and red light into yellow mixed light beams 751a, 751b. It is to be understood that only a three positions of the converter plate are illustrated and that the converter plate can be positioned in many different positions where different ratios of converted RED, GREEN and BLUE light can be mixed in order to create different colors.

Figure 9:
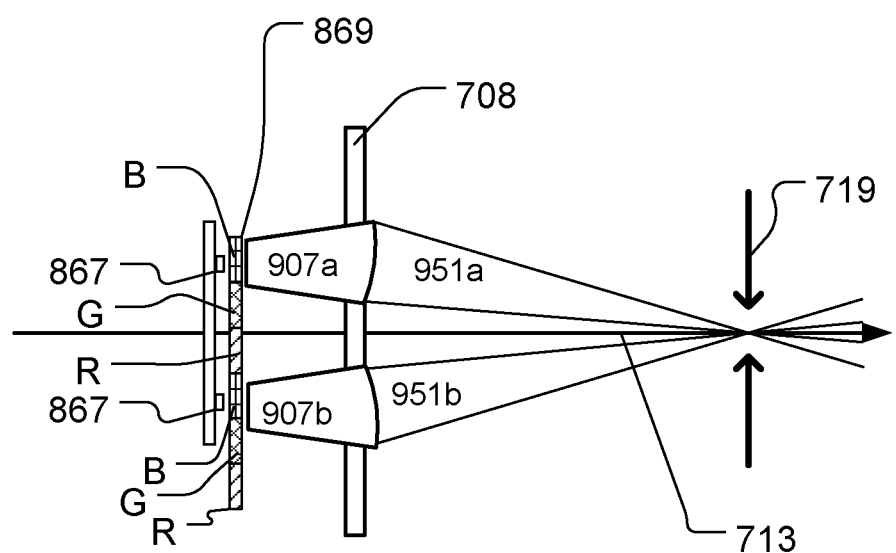
FIG. 9 illustrate another embodiment of an illumination device according to the present invention.

One advantage of embodiment illustrated in FIG. 8a-8c is the fact that the amount of light that are not collected by the light collectors are limited as the pumping light sources can be adapted to provide pumping light at those areas of the converting material which is below the entrance of the light collectors. This can for instance be achieved by the pumping light collectors 871. However, as illustrated in FIG. 9, it is to be under stood that the pumping light collectors 871 may be omitted and that the pumping light sources 967 can be adapted to emit pumping light directly at the converting plate. Further the pumping light can be emitted at the converting material from many different directions. In FIG. 9 the light collectors have be adapted to focus the mixed light beams 951a and 951b at the aperture 719 whereby the light collector 710 can be omitted.

It is also possible to provide dichroic filters at the entrance side of the converting material, where the entrance side of the converting is defining the side where the pumping light enters the converging material. In the illustrate embodiment the entrance side is the side of the converting plate which face the pumping light sources. The dichroic filters is adapted to reflect converted light and to transmit pumping light. The pumping light can therefore pas through the dichroic filters and be converted by the converting material. The converted light will be reflected forwards into the light collector and converted light which propagated backwards in the optical system will be reflected forwards whereby the intensity of the light will be increased. Alternatively the dichroic filters can be arranged at the exit surface of the pumping light collectors or at the top of the pumping light sources.

FIG. 10a-10e illustrates another embodiment of the illumination device 1001 according to the present invention. FIGS. 10a and 10c are a cross sectional views of the illumination device respectively along line D-D and E-E and illustrate respectively the light sources 1003/1005 and the light collecting means 1007 in the first and second position. FIGS. 10b and 10d are front views (seen from in front of the light collecting means 1007) respectively in the first position and in the second position. FIG. 10e is a front view of the PCB 1004 (seen from the light collecting means 1007) whereon the light sources 1003/1005 are arranged.

The illumination device 1001 comprises a number of light sources generating light, and the light sources are arranged in a first group of light sources 1003 (illustrated as white quadrangles) and in a second group of light sources 1005 (illustrated as hatched quadrangles). The light sources are mounted on a PCB 1004 (printed circuit board) and the two groups of light sources can be controlled individually for instance by a controller (not shown) as known in the art of lighting. The controller is thus adapted to treat the two groups of light sources as at least two individual groups of light sources which can be individually controlled. A number of light collecting means 1007 are arrange above the light sources 1003 and 1005. The light collecting means 1007 and light sources 1003/1005 are movable in relation to each other between the first position (illustrated in FIG. 10a) and the second position illustrated in FIG. 10b) and can be fixed in the first position and in the second position. In the first position the light collecting means 1007 are adapted to collect light from the first group of light sources 1003 and convert the collected light from the first group of light sources into a number of first light beams 1009. Similar in the second position the light collecting means 1007 are adapted to collect light from the second group of light sources 1005 and convert the collected light from the second group of light sources into a number of second light beams 1011.

The illumination device 1001 functions as a multimode illumination device as described above. In the illustrated embodiment the light collecting means are embodied as a number of TIR lenses mounted in a lens holder where the lens holder interacts with an actuator 1081. The actuator 1081 is adapted to rotate the light collecting means in relation to the light sources and around the optical axis. This can for instance be achieved by arranging the light collecting means in a bearing (not shown) where the actuator can rotate the light collecting means. It is to be understood that the person skilled in mechanical systems will be able to provide different systems capable of rotating the light collecting mean around the optical axis and in relation the light sources.

Additionally the number of light sources comprises a center light source 1077 arranged at the optical axis 1013 and the light collecting means comprises 1007 comprises center light collecting means 1079. The center light collecting means are adapted to collect at least a part of the light from the center light sources 1077 in both the first position and the second position. This makes it possible to provide a light source, which is use in both positions and provides further possibilities to design the collection of light sources. This can be achieved by letting the light collecting means and the light sources rotate in relation to each other around the optical axis and the center light collecting means will thus not be moved away from the center light source when shifting from the first position to the second position (or from the second position to the first position)

For instance in one embodiment the first group of light sources 1003 may be RGBW light sources for providing a RGBW lamp when the light collecting means are positioned in the first position. The second group of light sources may be white light sources providing a bright white light with a high CRI. The center light sources 1079 can in this situation also be a RGBW light source, which in the first position are controlled like the first group of light sources and this contributes to the overall illumination. In the second position the center light source can be controlled individually and makes it possible to adjust the color temperature of the white light, as the blue, green and red light sources can be used in the setup.

In another setup the first group of light sources are provided as red, green and blue light sources for instance as 3in1 LEDs having red die, green die and blue dies. Alternatively the first group of light sources can be embodied as individual LEDs e.g. two red LEDs, two green LEDs and blue LEDs or any other combination. In this setup the second groups of light sources are white light sources. In this setup the center light source 1079 can be a white light source which can be used to improve the CRI of the illumination device when in the first position.

It is to be understood that the skilled person will be able to provide a large range of different setups depending on the descried light output.

Figure 11:
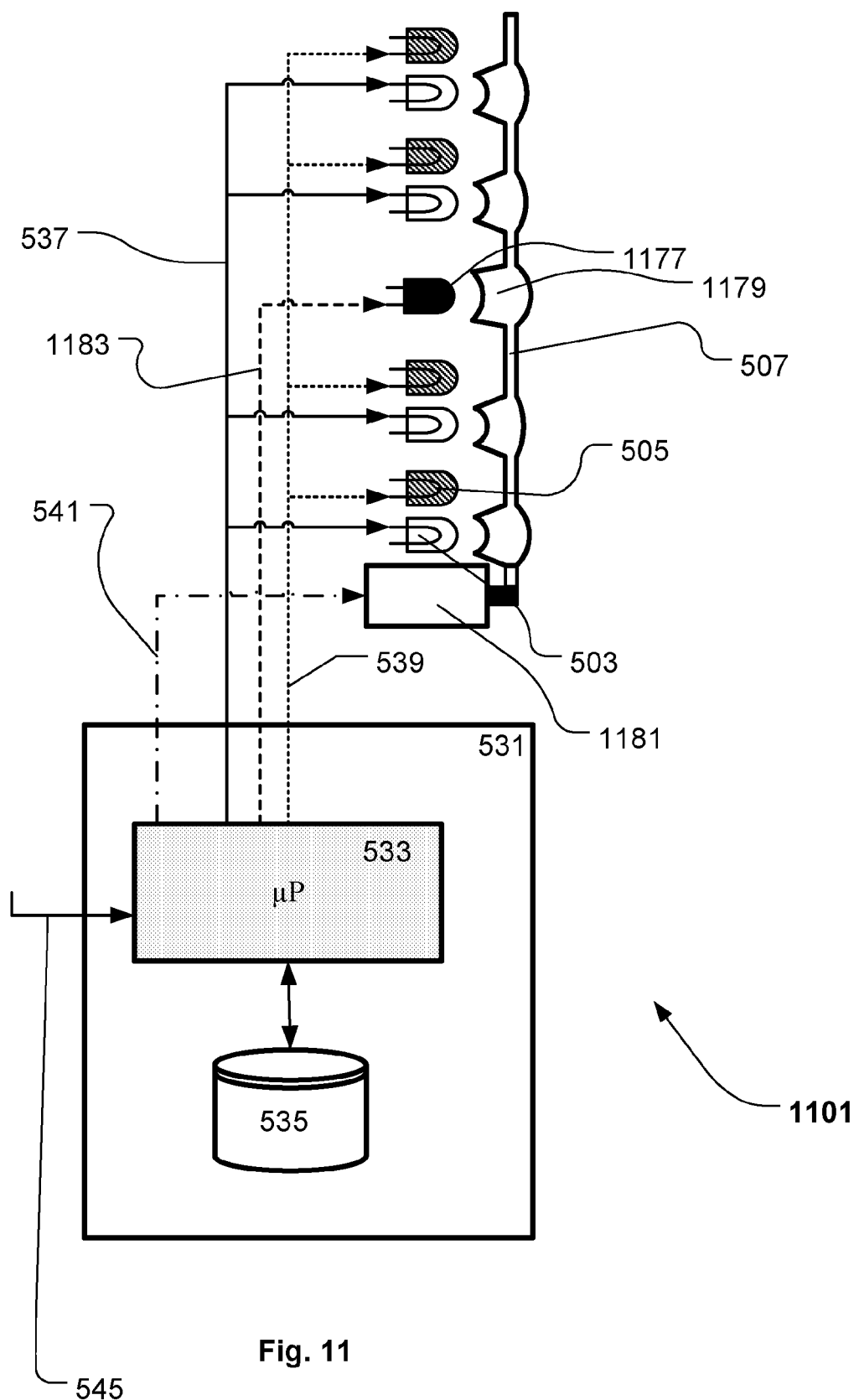
FIG. 11 illustrates another block diagram of an illumination device according to the present invention.

FIG. 11 illustrates a block diagram of an illumination device according 1101 having a similar setup as the illuminating device illustrated in FIG. 10. Further the basic the illumination device 1101 are substantially identical to the illumination device 501 illustrated in FIG. 5 and substantial identical components are labeled with the same reference numbers as in FIG. 5 and will not be described here below.

Like the illumination device illustrated in FIG. 10 and in addition to the first group of light sources 503 (white) and the second group of light sources 505 (hatched) the illumination device 1101 comprises a center light source 1177 adapted to collect light form the central light source. The light collecting means 507 comprises also a central light collector 1179.

The processor 533 is further adapted to control the center light source through communication means 1183 (in dashed lines). Meaning the processing means can control one of the groups of light sources without controlling the other group of light sources. The controlling can for instance be adapted to control the color and/or intensity of the light sources and can be based on any type of communication signals known in the art of lightning e.g. PWM, AM, FM, binary signals etc. The central light source can thus be controlled individually and independently of the first 503 and second 505 groups of light sources. Further the actuator 1181 has been adapted to rotate the light collecting means 507 around the optical axis between the first and second position and fix the light collecting means 507 in the first and second positions.

The controlling means can switch the illumination device 1179 between a first mode of operation and a second mode of operation. In the first mode of operation the light collecting means 507 and the light sources are arranged in the first position and the controlling means are adapted to control the first group of light sources while turning off the second group of light sources. In contrast hereto in the second mode of operation the light collecting means and the light sources are arranged in the second positioned and the controlling means are adapted to control the second group of light sources while turning off the first group of light sources. Further the controlling means are adapted to activate and control the center light collecting means in both the first and second mode of operation, where by the center light source can provide illuminations in both modes of operations.

In one embodiment and in the first mode of operation the controlling means are adapted to control the center light source based on the operation of the first group light sources. This makes it possible to synchronize the center light source with the first group of light sources which in an embodiment where the center light source is identical to the first group of light sources makes it possible to provide the same light output (e.g color) from the first group of light sources and the center light source.

In another embodiment an in the second mode of operation the controlling means are adapted to control the center light source at least partial independently of the second group of light sources. In the case where the center light source is an RGB or RGBW LED and the second group of light sources are white light sources this makes it possible to adjust the color temperature of the light by using the center light source. At least partially independently means that at least one parameter of the center light source is controlled independently of the second group of light sources. This means that some parameters of the center light source maybe controlled based on the controlling of the second group of light sources. For instance the color parameters of the center light source can be controlled independent able of the second group of light sources while the dimming parameter of the center light source are controlled based on the dimming parameter of the second group of light sources. This makes it possible to adjust the color temperature of the white light and ensures that the center light source is dimmed in the same way as the second group of light sources. It is also possible to implement predefined dimming schema where the color of the center light source are adjusted based on the dimming level of the second group of light sources. For instance this makes it possible to simulate the dimming curve of traditional light sources such as tungsten lamps or halogen lamps where the color temperature changes during dimming. The center light source can thus during dimming be adapted to adjust the color temperature based on the dimming level.

FIGS. 12*a* and 12*b* illustrate another embodiment of the illuminations device according to the present invention. FIG. 12*a* illustrates a cross sectional view of the illuminations device in the second position and FIG. 12*b* illustrates a top view of the light sources seen from the light collecting means 1207. Like the illumination device in FIG. 10 the illumination device 1201 comprises a first group of light sources 1203 (in white quadrangles), a second group of light sources 1205 (in hatched quadrangles) and a center light source 1279 (in black quadrangle). A number of light collectors 1207 are adapted to collect light from the light sources and convert the collected light into a number of light source beams (not shown). The number of light collector can, by an actuator 1281 interacting with the light collecting means, be rotated around the optical axes 1213 between a first position and a second position and. Where in the first position the light collectors collect light form the first group of light sources, and where in the second position the light collectors collects light form the second group of light sources. Similar as in FIG. 10 the light collector comprises a center light collector, which collects light from the center light source 1277 in both the first position and in the second position.

In this embodiment the first and second groups of light sources are arranged offset the optical axis and angled in relation to the optical axis. The light collecting means offset the optical axes are also angled in relation to the optical axis and the light beams generated by the offset light sources and the light collectors will direct the light beams towards an optical gate. The light sources and light collectors can be designed as known in the prior art for instance as described in JP2006269182 A2, WO0198706, U.S. Pat. No. 5,309,277 or WO2011076213. A gobo system 1283 as known in the art of entertainment lighting industry has been arranged in the optical gate along the optical axis 1213 and a projecting system 1222 have been adapted to image the gobos as distance along the optical axis.

In this embodiment the light sources have been arranged on and/or integrated into a number of PCBs 1204*a-g*, which are arranged on a cooling module 1285. The cooling module comprises a number of mounting surfaces 1287*a*-1287*g*. The center mounting surface 1287*g* is perpendicularly to the optical axis and comprises the PCT 1204*g* comprises the center LED. The mounting surfaces 1287*a*-1287*g* offset the optical axis are angled in relation to the optical axis and comprises respectively PCBs 1204*a*-1204*g*. Each of the PCBs 1204*a*-1204*g* comprises a light source belonging to the first group of light sources (white quadrangles) and a light source belonging to the second group of light sources (hatched quadrangles)). The cooling module may be embodied as described in WO2011076219.

The light collecting means are arranged in a lens holder 1208 which angles the offset light collectors in relation to the optical axis such that the generated light beams have the correct angle in relation to the optical axis. However it is to be understood that the light collectors can be embodied in one piece for instance molded in polymer or glass.

In this embodiment the light collecting means are embodied as a number of TIR lenses as described above the light collecting means can be embodied as any light collector capable of collecting light and generating a light beam.

It can be seen that the light sources are positioned inside a cavity of the TIR lens. As a consequence the actuator 1281 are adapted to move the light collectors away from the light sources before displacing the light sources and light collecting means in relation to each other when moving between the first and second position. This ensures that the light sources are moved out of the cavity whereby the light collectors can be moved between the first and second position. Once the light collectors and light sources have been arranged in the next position the actuator moved the light collectors towards the light sources whereby the light sources are arranged inside the cavity of TIR lenses.

The invention claimed is:

1. An illumination device comprising:
a number of light sources generating light, wherein said light sources are arranged into a first group of light sources and into a second group of light sources, wherein said first group of light sources is configured to generate light of at least two different colors and said second group of light sources comprises multi-die light emitting diodes (LEDs);

a number of light collecting means adapted to collect said generated light and to convert said collected light into a number of light beams, said light beams propagating along an optical axis; and a number of optical mixers arranged between said second group of light sources and said light collecting means, wherein said number of light sources and said light collecting means are movable in relation to each other between a first position and a second position, and said first group of light sources and said second group of light sources are individually controllable, wherein said light collecting means can be fixed in said first position to collect at least a part of said at least two different colors of light from said first group of light sources and convert said collected light from said first group of light sources into a number of first light beams, and can be fixed in said second position to collect at least a part of said light from said second group of light sources and convert said collected light from said second group of light sources into number of second light beams, and wherein said optical mixers are adapted to collect light from said second group of light sources to convert said collected light from said second group of light sources into a number of intermediate homogeneous light beams propagating towards said light collecting means.

2. The illumination device according to claim 1 characterized in that said first group of light sources and said second group of light sources are distributed around said optical axis and in that said first group of light sources is angular displaced around said optical axis in relation to said second group of light sources and in that said number of light sources and said number of light collecting means are moved between said first position and said second position by rotating said number of light sources and said number of light collecting means in relation to each other around said optical axis, where said rotation corresponds to said angular displacement between said first group of light sources and said second group of light sources.

3. The illumination device according to claim 1 characterized in further comprising a number of first intermediate light collecting means arranged between said first group of light sources and said light collecting means; said first intermediate light collecting means is adapted to collect light from said first group of light sources and convert said collected light from said first group of light sources into a number of first intermediate light beams propagating towards said light collecting means.

4. The illumination device according to claim 3 characterized in further comprising a number of second intermediate light collecting means arranged between said second group of light sources and said light collecting means; said second intermediate light collecting means are adapted to collect light from said second group of light sources and convert said collected light from said second group of light sources into a number of second intermediate light beams propagating towards said light collecting means.

5. The illumination device according to claim 4 characterized in that said first intermediate light beams and said second intermediate light beams have substantially the same beam width and divergence at said light collecting means.

6. The illumination device according to claim 1 characterized in that said number of light sources comprises a center light source arranged at said optical axis and in that said number of light collecting means comprises a center light collecting means, said center light collecting means being adapted to collect at least a part of said light from said center light sources both in said first position and in said second position.

7. The illumination device according to claim 1 characterized in further comprising an aperture positioned along said optical axis and optical convening means adapted to concentrate said first light beams and said second light beams at said aperture.

8. The illumination device according to claim 1 characterized in that said illumination device further comprises a projection system arranged along said optical axis, said projecting system is adapted to change the divergence of said generated light.

9. The illumination device according to claim 8 characterized in that said projecting system is adapted to image said aperture at a distance along said optical axis.

10. The illumination device according to claim 1 characterized in that said number of light sources and said light collecting means can be positioned in a number of mixing positions in relation to each other and in that in said number of mixing positions said light collecting means is adapted to collect at least a part of said light from said first group of light sources and at least a part of said light from said second group of light sources and convert said collected light into a number of mixed light beams.

11. The illumination device according to claim 10 characterized in that said number of light collecting means are embodied a number of optical light mixers being adapted to mix said collected light into a homogenized and uniform light beam, said optical light mixers being formed of a solid transparent material, where light enters said optical light mixer through an entrance surface and is reflected through said body to an exit surface where said light exits said optical light mixer.

12. The illumination device according to claim 1 characterized in further comprising controlling means adapted to switch said illumination device between a first mode of operation and a second mode of operation, where, in said first mode of operation, said light collecting means and said light sources are arranged in said first positioned in and said controlling means are adapted to control said first group of light sources while turning off said second group of light sources, and where, in said second mode of operation, said light collecting means and said light sources are arranged in said second positioned and said controlling means are adapted to control said second group of light sources while turning off said first group of light sources.

13. The illumination device according to claim 12 characterized in that said controlling means being adapted to control said center light source in both said first mode of operation and in said second mode of operation.

14. The illumination device according to claim 1 characterized in that said first group of light sources being of a different type than said second group of light sources.

15. A method of creating illumination using an illumination device that includes a number of light sources generating light and a number of light collecting means adapted to collect said generated light and to convert said collected light into a number of light beams, said light beams propagating along an optical axis, said method comprising:

arranging said light sources into a first group of light sources and into a second group of light sources, wherein said first group of light sources is configured to generate light of at least two different colors and said second group of light sources comprises multi-die light emitting diodes (LEDs);

displacing said number of light sources and said light collecting means in relation to each other between a first position and a second position;

and in said first position:
fixing said light collecting means and said first group of light sources in relation to each other;
generating light using said first group of light sources;
collecting at least a part of said generated light of at least two different colors from said first group of light sources using said light collecting means; and
converting said collected light from said first group of light sources into a number of first light beams using said light collecting means;

and in said second position:
fixing said light collecting means and said second group of light sources in relation to each other;
generating light using said second group of light sources;
collecting at least a part of said generated light from said second group of light sources using said light collecting means; and
converting said collected light from said second group of light sources into a number of second light beams using said light collecting means, wherein the illumination device further includes a number of optical mixers arranged between said second group of light sources and said light collecting means, wherein said optical mixers are adapted to collect light from said second group of light sources to convert said collected light from said second group of light sources into a number of intermediate homogeneous light beams propagating towards said light collecting means.

16. A method according to claim 15 characterized in that further comprising the steps of:
positioning said number of light sources and said light collecting means in a mixing positions in relation to each other;

and in said mixing position;
generating light using said first group of light sources;
generating light using said second group of light sources;
collecting at least a part of said generated light from said first group of light sources and said second group of light sources using said light collecting means;
converting said collected light from said first group of light sources and second group of light sources into a number of mixed light beams using said light collecting means.

17. A method according to claim 16 characterized in that said step of converting said collected light from said first group of light sources and said second group of light sources into a number of mixed light beams using said light collecting means comprises the step of:
mixing said collected light from said first group of light sources and said second group of light sources into a number of homogenized and uniform light beams.

18. An illumination device comprising:
a number of light sources generating light, wherein said light sources are arranged into a first group of light sources and into a second group of light sources, and said first group of light sources is configured to generate light of at least two different colors; and
a number of light collecting means adapted to collect said generated light and to convert said collected light into a number of light beams, said light beams propagating along an optical axis,
wherein said number of light sources and said light collecting means are movable in relation to each other between a first position and a second position, and said first group of light sources and said second group of light sources are individually controllable,
wherein said light collecting means can be fixed in said first position to collect at least a part of said at least two different colors of light from said first group of light sources and convert said collected light from said first group of light sources into a number of first light beams, and can be fixed in said second position to collect at least a part of said light from said second group of light sources and convert said collected light from said second group of light sources into number of second light beams, and
wherein said number of light sources and said light collecting means can be positioned in a number of mixing positions in relation to each other and in that in said number of mixing positions said light collecting means is adapted to collect at least a part of said light from said first group of light sources and at least a part of said light from said second group of light sources and convert said collected light into a number of mixed light beams.

19. The illumination device according to claim 18, wherein said number of light collecting means comprises a number of optical light mixers being adapted to mix said collected light into a homogenized and uniform light beam, said optical light mixers being formed of a solid transparent material, where light enters said optical light mixer through an entrance surface and is reflected through said body to an exit surface where said light exits said optical light mixer.

* * * * *

UNITED STATES PATENT AND TRADEMARK OFFICE
CERTIFICATE OF CORRECTION

| | |
|---|---|
| PATENT NO. | : 9,732,942 B2 |
| APPLICATION NO. | : 14/125251 |
| DATED | : August 15, 2017 |
| INVENTOR(S) | : Dennis Jørgensen |

Page 1 of 1

It is certified that error appears in the above-identified patent and that said Letters Patent is hereby corrected as shown below:

On the Title Page

(54) Title:
Please delete "COLOR MIXING ILLUMINATION DEVICE" and insert --MULTI-MODE ILLUMINATION DEVICE--.

Signed and Sealed this
Sixth Day of March, 2018

Andrei Iancu
*Director of the United States Patent and Trademark Office*